(12) United States Patent
Leikam et al.

(10) Patent No.: US 10,894,730 B2
(45) Date of Patent: *Jan. 19, 2021

(54) GEOTECHNICAL CHARACTERISTICS OF TAILINGS VIA LIME ADDITION

(71) Applicant: Graymont Western Canada Inc., Richmond (CA)

(72) Inventors: Jared Ira Leikam, West Jordan, UT (US); Nikolas Andrei Romaniuk, Edmonton (CA); Jesse Wayne Fox, West Valley City, UT (US); Michael John Tate, Oregon, OH (US); Narain Hariharan, College Station, TX (US)

(73) Assignee: GRAYMONT (PA) INC., Pleasant Gap, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/566,578

(22) Filed: Sep. 10, 2019

(65) Prior Publication Data

US 2020/0079664 A1    Mar. 12, 2020

Related U.S. Application Data

(60) Provisional application No. 62/806,512, filed on Feb. 15, 2019, provisional application No. 62/729,955, filed on Sep. 11, 2018.

(51) Int. Cl.
*C02F 1/52* (2006.01)
*F26B 5/00* (2006.01)
(Continued)

(52) U.S. Cl.
CPC ............ *C02F 1/5245* (2013.01); *B01D 21/30* (2013.01); *C02F 11/12* (2013.01); *C02F 11/145* (2019.01);
(Continued)

(58) Field of Classification Search
None
See application file for complete search history.

(56) References Cited

U.S. PATENT DOCUMENTS 3,502,575 A   3/1970   Hepp et al.
3,859,799 A   1/1975   Jaco
(Continued)

FOREIGN PATENT DOCUMENTS

CA   1138361 A   12/1982
CA   1291957 C   11/1991
(Continued)

OTHER PUBLICATIONS

Geramian et al. (Energy & Fuels, 2016, 30, 8083-8090). (Year: 2016).*

(Continued)

*Primary Examiner* — Clare M Perrin
(74) *Attorney, Agent, or Firm* — Perkins Coie LLP

(57) ABSTRACT

Methods and systems for treating tailings at an elevated pH using lime are disclosed herein. In some embodiments, the method comprises (i) providing a tailings stream comprising bicarbonates and a pH less than 9.0, (ii) adding a coagulant comprising calcium hydroxide to the tailings stream to form a mixture having a pH of at least 11.5 and a soluble calcium level no more than 800 mg/L, and (iii) dewatering the mixture to produce a product having a solids content of at least 40% by weight. In some embodiments, the pH and soluble calcium level of the mixture cause chemical modification of clay materials of the mixture via pozzolanic reactions. In some embodiments, the undrained shear strength of the product increases over a period of time of at least two days.

22 Claims, 14 Drawing Sheets

(51) Int. Cl.
  *C02F 11/145* (2019.01)
  *C10G 1/04* (2006.01)
  *B01D 21/30* (2006.01)
  *C02F 11/12* (2019.01)
  *B65G 5/00* (2006.01)
  *B09B 1/00* (2006.01)
  *B01D 21/01* (2006.01)
  *C02F 11/148* (2019.01)
  *E21B 21/06* (2006.01)
  *E21B 43/34* (2006.01)
  *C02F 103/10* (2006.01)
  *C02F 1/56* (2006.01)

(52) U.S. Cl.
  CPC .............. *C10G 1/045* (2013.01); *F26B 5/005* (2013.01); *B01D 21/01* (2013.01); *B09B 1/00* (2013.01); *B65G 5/00* (2013.01); *C02F 1/5281* (2013.01); *C02F 11/148* (2019.01); *C02F 2103/10* (2013.01); *C02F 2201/002* (2013.01); *E21B 21/068* (2013.01); *E21B 43/34* (2013.01)

(56) References Cited

U.S. PATENT DOCUMENTS

| | | | |
|---|---|---|---|
| 4,173,532 A | 11/1979 | Keoteklian | |
| 4,225,433 A | 9/1980 | Liu et al. | |
| 4,229,295 A | 10/1980 | Krofchak | |
| 4,240,897 A | 12/1980 | Clarke | |
| 4,282,103 A | 8/1981 | Fuhr et al. | |
| 4,409,091 A | 10/1983 | Kessick | |
| 4,414,117 A | 11/1983 | Yong et al. | |
| 5,118,219 A * | 6/1992 | Walker, Jr. | C04B 28/065 405/129.45 |
| 5,575,922 A * | 11/1996 | Green | C02F 1/66 210/713 |
| 5,846,314 A | 12/1998 | Golley | |
| 6,267,250 B1 | 7/2001 | Leung et al. | |
| 7,695,612 B2 | 4/2010 | Erasmus et al. | |
| 10,369,518 B2 | 8/2019 | Tate et al. | |
| 2011/0042319 A1 | 2/2011 | Remy | |
| 2011/0192769 A1 | 8/2011 | Garland | |
| 2012/0145646 A1 | 6/2012 | Bae et al. | |
| 2013/0019780 A1 | 1/2013 | Karimi et al. | |
| 2013/0187087 A1 | 7/2013 | Scheurman | |
| 2013/0206702 A1 | 8/2013 | Lin et al. | |
| 2014/0054231 A1 | 2/2014 | Spence et al. | |
| 2014/0072653 A1 | 3/2014 | Buschmann | |
| 2014/0101967 A1* | 4/2014 | Lorentz | C10G 1/045 34/386 |
| 2014/0116946 A1 | 5/2014 | Mikula et al. | |
| 2015/0034530 A1 | 2/2015 | Speirs et al. | |
| 2016/0304366 A1 | 10/2016 | Moore et al. | |
| 2017/0182431 A1* | 6/2017 | Gupta | B01D 1/28 |
| 2018/0065887 A1 | 3/2018 | Ingram et al. | |
| 2018/0099883 A1 | 4/2018 | Wilson et al. | |
| 2019/0055149 A1 | 2/2019 | Tate et al. | |
| 2019/0135663 A1 | 5/2019 | Tate et al. | |

FOREIGN PATENT DOCUMENTS

| | | | |
|---|---|---|---|
| CA | 2188064 A1 | 4/1998 | |
| CA | 2522031 A1 * | 4/2006 | ............... B03B 9/02 |
| CA | 2522031 C | 2/2013 | |
| CA | 2824543 A1 | 2/2014 | |
| CA | 2792786 A1 | 4/2014 | |
| CA | 2825513 A1 | 4/2014 | |
| CA | 2977524 A1 | 2/2018 | |
| KR | 1020080054335 A | 6/2008 | |
| WO | 2013096787 A1 | 6/2013 | |
| WO | 2017143441 A1 | 8/2017 | |

OTHER PUBLICATIONS

Chalaturnyk et al., "management of oil sands tailings", Petroleum Science and Technology, 2002, vol. 20, Nos. 9&10, pp. 1025-1046.

CNRL Presentation "Lime Coagulation of Oil Sand Tailings" Feb. 19, 2017.

International Search Report and Written Opinion dated Dec. 30, 2019; International Application No. PCT/US2019/050448; 7 pages.

Lime in MFT Exploratory Work Presentation "Current Work on Lime Addition to MFT" Oct. 11, 2016.

Morgenstern Presentation "Lime as a Coagulant" Graymont Inc., Apr. 26, 2017.

Romaniuk et al., "Effect of Lime Coagulation on Strength and Atterberg Properties of Clays in Oil Sands Tailings" Clay Mineral Society Conference, Jun. 7, 2017.

Stagegate Presentation "Texas A&M Update" May 18, 2017.

Tate M., et al. "Impacts of Calcium Compounds on Oil Sands Water Chemistry" 2016 White Paper.

BGC Engineering, Inc., "Oil Sands Tailings Technology Review", Oil Sands Research and Information Network, University of Alberta, School of Energy and the Environment, Edmonton, Alberta. OSRIN Report No. TR-1, Jul. 2010.

* cited by examiner

GEOTECHNICAL CHARACTERISTICS OF TAILINGS VIA LIME ADDITION

CROSS-REFERENCE TO RELATED APPLICATIONS

The present application claims the benefit of U.S. Provisional Patent Application No. 62/806,512, filed Feb. 15, 2019, and U.S. Provisional Patent Application No. 62/729,955, filed Sep. 11, 2018, the disclosures of which are incorporated herein by reference in their entireties.

TECHNICAL FIELD

This present disclosure relates to systems and methods for treating tailings, and more particularly to improving geotechnical characteristics of tailings via lime addition.

BACKGROUND

Dewatering and reclaiming oil sand tailings have proven difficult. A number of treatment processes have been proposed but none have been able to cost effectively meet government regulatory standards. One such standard was Alberta Energy Regulator's (AER's) Directive 74, which targeted for treated tailings a minimum undrained shear strength of 5 kilopascals (kPa) within one year of placement in a Dedicated Disposal Area (DDA). Reclamation of the DDA was to be within 5 years after the completion of active deposition and required a minimum shear strength of 10 kPA to achieve a trafficable surface. Despite significant research by industry, Directive 74 proved difficult to meet and was replaced by AER's Directive 85 (Fluid Tailings Management for Oil Sands Mining Projects). Rather than target specific strength levels, Directive 85 requires all legacy tailings to be reclaimed by the end of mine life and all new tailings to be reclaimed within ten years of the end of mine life. Meeting these requirements will require new treatment technologies for fine tailings that will gain enough strength to be used for landform development in a short timeframe. At the present time, approximately 1.2 billion cubic meters of legacy tailings ponds currently exist that have clay particles suspended in process water. Though sand and overburden from the mining operations can be used in reclamation efforts of these ponds, the fine clays have been difficult to reclaim because of their high plasticity index. Previous attempts to dewater tailings containing these fine clays have resulted in treated tailings that have low initial shear strength and show temporary or no permanent strength development over time. Accordingly, a need exists to effectively treat such tailings.

BRIEF DESCRIPTION OF THE DRAWINGS

Features, aspects, and advantages of the presently disclosed technology may be better understood with regard to the following drawings.

Figure 1:
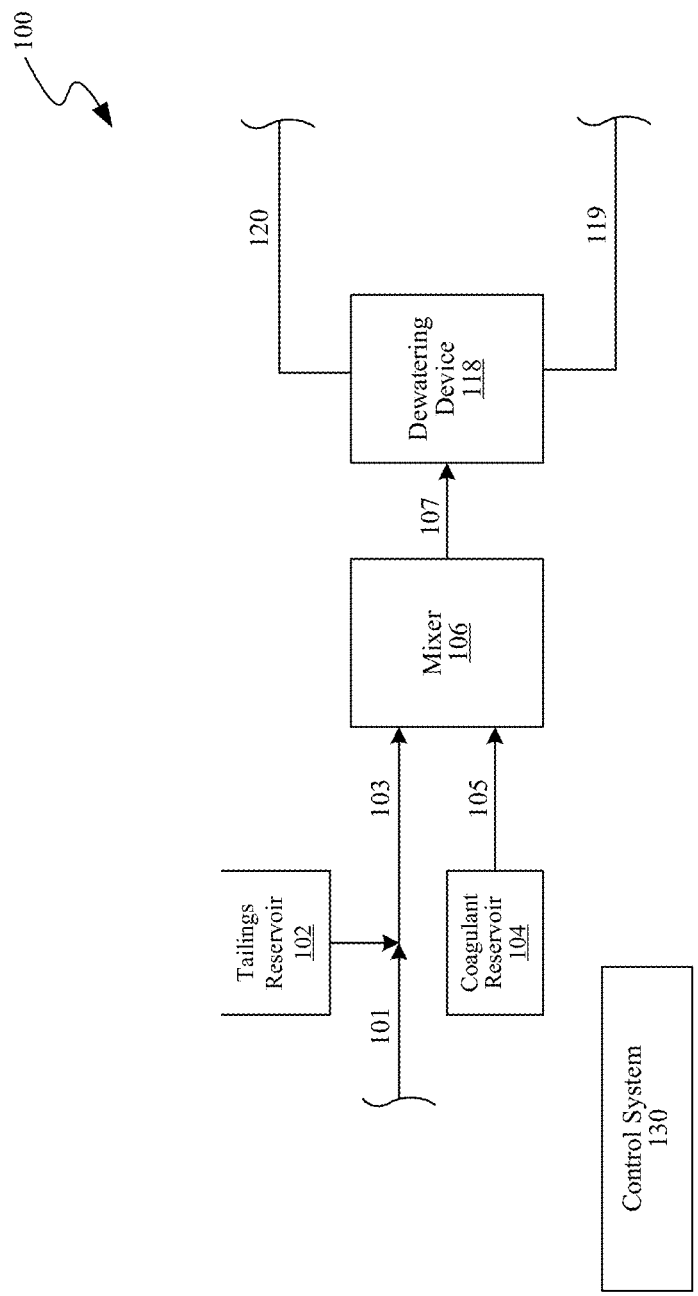
FIG. 1 is a schematic block diagram of a tailings dewatering system, in accordance with embodiments of the present technology.

A person skilled in the relevant art will understand that the features shown in the drawings are for purposes of illustrations, and variations, including different and/or additional features and arrangements thereof, are possible.

DETAILED DESCRIPTION

I. Overview

Embodiments of the present disclosure relate to improving strength or geotechnical characteristics of treated tailings via lime addition. Tailings are often treated with coagulants other than lime, such as gypsum, alum, or calcium chloride, in an effort to dewater the tailings and produce a cake suitable for storage and/or disposal. However, as described elsewhere herein, treating tailings with these coagulants does not sufficiently increase the strength profile of cakes such that they can be appropriately stored, disposed, and/or meet regulatory requirements. Though strengths of treated tailings can increase over time through settling and consolidation, oil sands tailings consolidate at an extremely low rate, if it all, which has created a barrier for reclamation efforts. For example, treatment of tailings with gypsum, alum, calcium chloride, or combinations thereof, does not increase the tailings' undrained shear strength (e.g., peak, remolded and/or residual shear strength) or undrained shear stress (e.g., peak, remolded and/or residual shear stress)

immediately after treatment or after a period of time (e.g., 2 days, 7 days, 28 days, or longer) on a substantially permanent basis. Instead, the strength profiles of cakes produced using these coagulants remain unchanged over time or are increased only temporarily. For example, oil sand tailings treated with these coagulants can gain strength by drying, but this strength can be lost when the treated tailings becomes wet again.

Tailings have also been treated with coagulants including lime. However, unlike embodiments of the present disclosure, such treatment has been unable to sustain improved strength profiles of the cakes over time (e.g., on a substantially permanent basis) via the chemical formation of hydraulically cementitious compounds on surfaces of the tailings' clay materials. This is due in part to one or more of treating the tailings (i) without first removing bicarbonates from the process water, (ii) at a pH level that is too low, and/or (iii) without supplying sufficient calcium cations to drive the pozzolanic reactions and chemically convert clays of the tailings, thereby preventing pozzolanic activity and other related reactions from occurring.

Embodiments of the present disclosure address at least some of the above described issues for treating tailings to produce a product with improved geotechnical and strength characteristics. For example, embodiments of the present disclosure include treating tailings with a coagulant comprising calcium hydroxide to form a first mixture having a pH of at least 11.5 and a soluble calcium level of no more than 800 mg/L (e.g., 800 parts per million (ppm)), or in some embodiments no more than 100 mg/L. Without being bound by theory, a pH of 11.5 can enable cation exchange to occur, e.g., between the calcium cations of the calcium hydroxide and sodium compounds on the clay materials of the tailings. Chemical reactions between calcium hydroxide and bicarbonates in the process water maintain the soluble calcium level below a certain threshold at this stage of the treatment. Embodiments of the present disclosure can further comprise adding a flocculant (e.g., an anionic polyacrylamide polymer) to the first mixture to form a second mixture. The flocculant can bind to free water molecules of the second mixture and aid the mechanical separation of the water molecules from the remainder of the second mixture. Embodiments of the present disclosure can further comprise adding a second coagulant comprising calcium hydroxide to form a third mixture having a pH of at least 12.0 and a soluble calcium level of no more than 800 mg/L. Without being bound by theory, a pH of at least 12.0 can enable pozzolanic activity within the third mixture, causing clay materials (e.g., kaolinite, illite, etc.) to be chemically modified and produce calcium bound hydrates (e.g., silicate and/or aluminate hydrates) therefrom. In doing so, the clay materials provided by the tailings can be substantially permanently modified to form a cementitious crust or matrix having shear strength above a certain threshold (e.g., 2 kilopascals (kPa), 3 kPa, 4 kPa, 5 kPa, 6 kPa, or greater. The third mixture may be dewatered via a dewatering device to form a product (e.g., a cake) having a solids content of at least 40% by weight.

Embodiments of the present disclosure enable the product to have improved geotechnical and/or strength characteristics relative to conventional systems and methods for treating tailings. For example, as described elsewhere herein, the product can include an undrained shear strength that increases over a period of time of at least two days, or in some embodiments 7 days, 14 days, 30 days, 60 days, 120 days, or longer. In addition to or in lieu of the foregoing, as described in detail elsewhere herein, the product can include other characteristics that improve over the period of time, such as plasticity index (i.e., decreases over time), plastic limit (i.e., increases over time), and particle size (i.e., increases over time), amongst other characteristics.

In the Figures, identical reference numbers identify generally similar, and/or identical, elements. Many of the details, dimensions, and other features shown in the Figures are merely illustrative of particular embodiments of the disclosed technology. Accordingly, other embodiments can have other details, dimensions, and features without departing from the spirit or scope of the disclosure. In addition, those of ordinary skill in the art will appreciate that further embodiments of the various disclosed technologies can be practiced without several of the details described below.

II. Systems and Method for Improving Geotechnical and/or Strength Characteristics of Tailings Streams Via Lime Addition FIG. 1 is a schematic block diagram of a tailings dewatering system 100 ("system 100"), in accordance with embodiments of the present technology. As shown in the illustrated embodiment, the system 100 includes tailings 103 and a coagulant 105 that are provided to a mixer 106. The mixer 106 combines the tailings 103 and coagulant 105 to produces a mixture 107 that is provided to a dewatering device 118. As explained in additional detail below, the dewatering device 118 separates the mixture 107 into a first stream 119 (e.g., a product or "cake") comprising a solids content of at least 40% by weight, and a second stream 120 comprising release water. The first stream 119 can be provided to a disposal or containment area (e.g., a pond or diked area) and the second stream 120 may be provided as recycle or effluent to a disposal or containment area.

The tailings 103 can be provided from a tailings reservoir 102 (e.g., a pond, diked area, tank, etc.), or directly from another process stream 101 (e.g., an extraction process stream, a treatment process stream, etc.) without being routed through the tailings reservoir 102. In some embodiments, the tailings 103 can originate from operations related to oil sands and include the remains of the oil sands operations after extraction of bitumen content. For example, the tailings 103 can include whole-tailings (WT), thin fluid tailings (TFT), fluid fine tailings (FFT), hydro-cyclone overflow or underflow, and/or mature fine tailings (MFT). In some embodiments, the tailings 103 can originate from the extraction of minerals (e.g., copper, iron ore, gold and/or uranium), e.g., from mining operations. Similar to oil sands tailings, tailings from mining operations contain clay materials that be dewatered and strengthened through pozzolanic reactions with calcium hydroxide. Additionally or alternatively, treatment with calcium hydroxide has other benefits such as pH adjustment, bicarbonate removal, heavy metals removal, and the treatment of sulfur and other impurities originating from mineral tailings.

The tailings 103 can have a pH less than about 10.0, 9.0, or 8.0, or from about 7.0-10.0, 7.5-9.5, or 8.0-9.0. The composition of the tailings 103 can include water (e.g., extraction water), sand, bicarbonates (e.g., sodium bicarbonate), sulfates, clay (e.g., kaolinite, illite, etc.), residual bitumen particles, and other impurities that are suspended in the water. In some embodiments, the tailings 103 can include a solids content of from about 5-40%, a bitumen content from about 0-3%, and/or a clay content from about 40-100%. The tailings 103 can be obtained as a batch process (e.g., intermittently provided from tailings ponds) or as a steady-state extraction process (e.g., continuously provided from oil sands or mining operations, or stepwise feeding in pattern). In some embodiments, the tailings 103 may undergo upstream processing prior to the tailings reservoir 102, e.g., cyclone separation, screen filtering, thickening and/or dilution processes. The tailings 103 entering the mixer 106 may also be diluted to decrease the solids content thereof.

The coagulant 105 can include lime and/or inorganic materials that provide divalent cations (e.g., calcium), and may be provided from a coagulant reservoir 104 (e.g., a tank). The lime can include hydrated lime (e.g., calcium hydroxide ($Ca(OH)_2$) and/or slaked quicklime (e.g., calcium oxide (CaO)). In some embodiments, the hydrated lime can include enhanced hydrated lime (e.g., calcium hydroxide particles having a specific surface area of at least 25 $m^2/g$), as described in U.S. patent application Ser. No. 15/922,179, now U.S. Pat. No. 10,369,518, filed Mar. 15, 2018, the disclosure of which is incorporated herein by reference in its entirety. The lime can be part of a slurry such that the lime makes up a portion (e.g., no more than 30%, 25%, 20%, 15%, 10%, or 5% by weight) of the lime slurry. The remainder of the lime slurry can include water (e.g., release water, makeup water, and/or process water). In some embodiments, the lime or lime slurry can include dolomitic lime (e.g., lime including at least 25% magnesium oxide on a non-volatile basis), or a combination of quicklime, limestone (e.g., calcium carbonate ($CaCO_3$)), hydrated lime, enhanced hydrated lime, dolomitic lime, lime kiln dust, and/or other lime-containing materials. The lime can have a pH of from about 12.0-12.5.

As previously described, the tailings 103 and the coagulant 105 can be combined in the mixer 106 to produce the mixture 107. The mixer 106 can be a static mixer, a dynamic mixer, or a T-mixer, and/or can include rotatable blades or other means to agitate the combined tailings 103 and coagulant 105. The residence time in the mixer 106 for the tailings 103 and coagulant 105 can be, e.g., less than about 30 seconds, 60 seconds, 5 minutes. In some embodiments, the mixer 106 is omitted and the tailings 103 and coagulant 105 can be mixed in-line (e.g., via turbulent flow conditions). In general, the tailings 103 and coagulant 105 are mixed (e.g., via the mixer 106 or in-line) to ensure the mixture 107 exiting the mixer 106 has a substantially uniform composition, and a desired pH and/or soluble calcium level. The pH of the mixture 107 can be at least about 11.5, 11.6, 11.7, 11.8, 11.9, 12.0, 12.1, 12.2, 12.3, 12.4 or 12.5. In some embodiments, the pH of the mixture is within a range of 11.5-12.0. Additionally or alternatively, the soluble calcium level (i.e., the calcium cations in solution) of the mixture 107 is no more than 800 mg/L, 750 mg/L, 700 mg/L, 650 mg/L, 600 mg/L, 550 mg/L, 500 mg/L, 450 mg/L, 400 mg/L, 350 mg/L, 300 mg/L, 250 mg/L, 200 mg/L, 150 mg/L, 100 mg/L, 90 mg/L, 80 mg/L, 70 mg/L, 60 mg/L, 50 mg/L, 40 mg/L, or 30 mg/L. In some embodiments, the soluble calcium level of the mixture is within a range of 10 mg/L-100 mg/L. As explained in additional detail elsewhere herein (e.g., with reference to FIG. 2A), the soluble calcium level of the mixture 107 is in part dependent on the pH of the mixture and the bicarbonates present in the tailings 103, which react with the calcium ions and reduce the free calcium concentration. In some embodiments, a pH of from 11.5 to 12.0 enables ion exchange to occur between the tailings 103 and coagulant 105, and can aid in minimizing the bicarbonates present in the mixture 107. In practice, the pH of the mixture 107 can be measured, e.g., at the outlet of the mixer 106, and used to control the pH and/or soluble calcium level of the mixture 107 by (i) increasing or decreasing the feed rate of the incoming coagulant 105, and/or (ii) increasing or decreasing the residence time of the tailings 103 and coagulant 105 in the mixer 106.

As shown in FIG. 1, the system 100 can further include a control system 130 to control operations associated with the system 100. Many embodiments of the control system 130 and/or technology described below may take the form of computer-executable instructions, including routines executed by a programmable computer. The control system 130 may, for example, also include a combination of supervisory control and data acquisition (SCADA) systems, distributed control systems (DCS), programmable logic controllers (PLC), control devices, and processors configured to process computer-executable instructions. Those skilled in the relevant art will appreciate that the technology can be practiced on computer systems other than those described herein. The technology can be embodied in a special-purpose computer or data processor that is specifically programmed, configured or constructed to perform one or more of the computer-executable instructions described below. Accordingly, the term "control system" as generally used herein refers to any data processor. Information handled by the control system 130 can be presented at any suitable display medium, including a CRT display or LCD.

The technology can also be practiced in distributed environments, where tasks or modules are performed by remote processing devices that are linked through a communications network. In a distributed computing environment, program modules or subroutines may be located in local and remote memory storage devices. Aspects of the technology described below may be stored or distributed on computer-readable media, including magnetic or optically readable or removable computer disks, as well as distributed electronically over networks. Data structures and transmissions of data particular to aspects of the technology are also encompassed within the scope of particular embodiments of the disclosed technology.

Figure 2A:
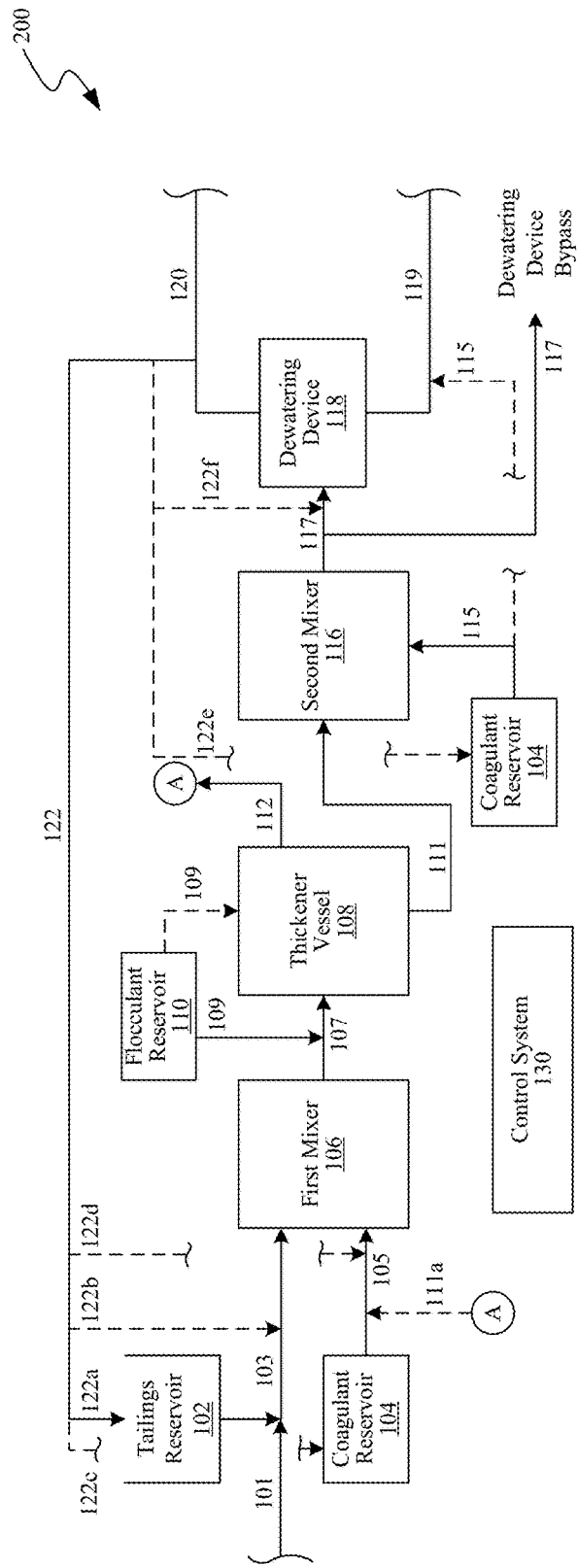
FIGS. 2A and 2B are schematic block diagrams of a tailings dewatering system, in accordance with embodiments of the present technology.
Figure 2B:
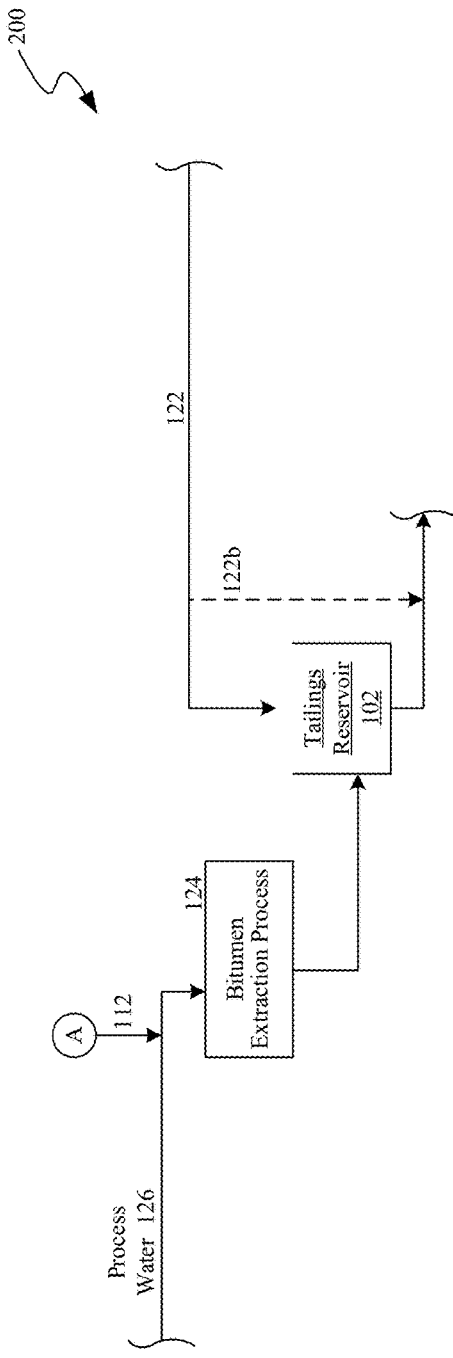

FIGS. 2A and 2B are schematic block diagrams of a tailings dewatering system ("system 200"), in accordance with embodiments of the present technology. The system 200 includes components and elements similar or identical to those described with reference to FIG. 1. For example, the system 200 includes the previously described tailings 103, coagulant 105 (e.g., first coagulant), mixer 106 (e.g., first mixer 106), and mixture 107 (e.g., first mixture).

Combining the first coagulant 105 (e.g., calcium hydroxide) with the tailings 103 (e.g., in the first mixer 106 or in-line) increases the pH of the tailings 103 to be at least about 11.5. At or below a pH of 11.5, bicarbonates present in the tailings 103 are substantially depleted due to reactions with the calcium hydroxide. In doing so, the soluble calcium ions needed for cation exchange within the first mixture 107, e.g., between the calcium cations and bicarbonates provided by the tailings 103, are reduced. Without being bound by theory, such a pH can also enable the first coagulant 105 to alter the surface charges of the clay of the tailings 103, which promotes dewatering thereof. Using a coagulant other than calcium hydroxide, such as alum ($Al_2(SO_4)_3$)), gypsum ($CaSO_4 \cdot 2H_2O$) and/or calcium chloride ($CaCl_2$)), to treat the tailings 103 would not enable the clay of the tailings 103 to release water in the same manner as calcium hydroxide would. Reactions between alum, gypsum, and/or calcium chloride and the clay would not produce hydroxides and/or a mixture having a pH of at least 11.5. Instead, treating the tailings stream with alum, for example, would produce hydrogen ions (e.g., as sulfuric acid) and generally result in a mixture having a pH less than 9.0. As explained in detail elsewhere herein, such a low pH would preclude pozzolanic reactions from occurring and thereby prevent chemically modifying the tailings 103 to produce a cake within sufficiently high shear strength. Additionally or alternatively, treating the tailings stream with alum, gypsum, calcium chloride, or other coagulants other than calcium hydroxide would not (i) provide the necessary pH (e.g., a pH of at least about 11.5) to solubilize silicates and aluminates of the tailings stream, and/or (ii) supply the necessary soluble calcium ions for pozzolanic reactions to occur.

Adding the first coagulant 105 including calcium hydroxide to the tailings 103 can cause or enable Reactions 1-4 below to occur within the first mixture 107.

$$Ca(OH)_{2(aq)} + NaHCO_{3(aq)} \rightarrow \rightarrow CaCO_{3(aq)} + NaOH_{(aq)} + H_2O \quad \text{(Reaction 1)}$$

$$NaOH_{(aq)} + NaHCO_{3(aq)} \rightarrow Na_2CO_{3(aq)} + H_2O \quad \text{(Reaction 2)}$$

$$Ca(OH)_{2(aq)} + Na_2CO_{3(aq)} \rightarrow CaCO_{3(aq)} + 2NaOH_{(aq)} \quad \text{(Reaction 3)}$$

$$Ca(OH)_{2(aq)} \rightarrow Ca^{2+}_{(aq)} + 2OH_{(aq)} \quad \text{(Reaction 4)}$$

Per Reaction 1, when sodium bicarbonate ($NaHCO_3$) of the tailings 103 is exposed to calcium hydroxide ($Ca(OH)_2$), calcium cations (Ca') bond with carbonate ions ($CO_3^{2-}$) and sodium bicarbonate is converted to calcium carbonate ($CaCO_3$) (also referred to herein as "calcite"), sodium hydroxide (NaOH) and water ($H_2O$). Per Reaction 2, the produced sodium hydroxide from Reaction 1 reacts with sodium bicarbonate to produce sodium carbonate ($Na_2CO_3$) and water. Per Reaction 3, calcium hydroxide of the first coagulant 105 reacts with the produced sodium carbonate from Reaction 2 to produce calcium carbonate and sodium hydroxide. Per Reaction 4, and as a result of the pH of the first mixture 107 being at or above about 11.5, calcium hydroxide will also readily solubilize to form calcium cations and sodium hydroxide.

In practice, Reactions 1 and 3 are limited only by the availability of carbonate ions in the first mixture (i.e., provided by the tailings). As such, Reactions 1 and 3 will reduce the amount of soluble calcium cations available for cation exchange (and pozzolanic reactions) to occur. Stated differently, Reactions 1 and 3 limit the amount of free calcium cations available to react with clays in the first mixture until the carbonate ions are largely depleted and/or removed from the first mixture. As a result of Reactions 1-4, in some embodiments the first mixture has a soluble calcium level of no more than 100 mg/L, 90 mg/L, 80 mg/L, 70 mg/L, 60 mg/L, 50 mg/L, 40 mg/L, or 30 mg/L.

As shown in FIG. 2A, the first mixture 107 can be combined with a flocculant 109, e.g., from a flocculant reservoir 110 (e.g., a tank or reservoir). The flocculant 109 can be combined with the first mixture 107 in-line and/or in a thickener vessel 108 (e.g., a tank or reservoir). The vessel 108 can form, via separation of the first mixture 107, (i) a second mixture 111 including a thickened composition having less water content than that of the first mixture 107, and (ii) process water 112. Without being bound by theory, separation of the first mixture 107 into the second mixture 111 and the process water 112 is promoted at least in part by the pH of the first mixture 107 being at least 11.5 and/or the coagulant 105 including calcium hydroxide which alters the surface charges of the clay of the tailings 103 to promote dewatering.

The second mixture 111 can include similar solid minerals, pH and soluble calcium level to that of the first mixture 107. The process water 112 can be routed to a separate process (e.g., for bitumen extraction), while the second mixture 111 is routed to further downstream processing. By separating the second mixture 111 and process water 112, the vessel 108 decreases the amount of water in the second mixture 111 and the overall volume to be processed by downstream equipment such as the dewatering device 118. Accordingly, a higher volume of the tailings 103 can be processed by the system 200 relative to systems that do not remove the process water 112 in such a manner. Additionally, separation of the second mixture 111 and process water 112 from one another can decrease overall cycle time of the system 200.

The process water 112 can include hydroxides (e.g., sodium hydroxide), bicarbonates from the tailings 103, and/or other compounds formed as byproducts of reacting the coagulant 105 with the tailings 103. As shown in FIG. 2A, the process water 112 can be used as a dilutant, e.g., by combining the process water 112 with the coagulant 105 to form the lime slurry previously described. Additionally or alternatively, as shown in FIG. 2B, the process water 112 can be directed toward and used to promote bitumen extraction, e.g., by combining the process water 112 with other process water 126. In some extraction processes for oil sands operations, the process water 126 can be supplemented/treated with sodium particles ($Na^+$) to aid the release of bitumen from the oil sands ore. Accordingly, one advantage of routing the process water 112 to treat or mix with the process water 126 is the ability to decrease any supplement addition of sodium particles. Additionally, since the process water 112 is at least slightly alkaline due to the excess hydroxide ions present therein, recycling the process water 112 to the extraction process can increase the pH of the oil sand ore and thereby improve bitumen extraction efficiency for the system 200. Yet another advantage of recycling the process water 112 is that heat is already present in the process water 112, and thus recycling it may require less downstream heating requirements compared to using just the process water 126. Yet another advantage of recycling the process water 112 is removing the volume of the process water 112 from the second mixture 111, which increases the solids content of the second mixture 111 and minimizes the overall volume of material that needs to be dewatered, e.g., via dewatering device 118. This decrease in volume can increase overall throughput of the system 200, thereby decreasing time and costs associated with operating the dewatering device 118.

The flocculant 109 can include one or more anionic, cationic, nonionic, or amphoteric polymers, or a combination thereof. The polymers can be naturally occurring (e.g., polysaccharides) or synthetic (e.g., polyacrylamides). In some embodiments, the flocculant 109 can be added as a part of a slurry, which may include less than 1% (e.g., about 0.4%) by weight of the flocculant 109, with the substantial remainder being water (e.g., process water, release water, and/or makeup water). In some embodiments, at least one component of the flocculant 109 will have a high molecular weight (e.g., up to about 50,000 kilodaltons). In some embodiments, the flocculant 109 will have a low molecular weight (e.g., below about 10,000 kilodaltons). As described in detail elsewhere herein, the flocculant 109 can promote thickening (e.g., increasing the solids content) of the second mixture 111, e.g., by forming bonds with colloids in the vessel 108, e.g., that were originally provided via the tailings 103. That is, the flocculant 109 can bond with the clay present in the tailings 103 to form a floc that is physically removed from the rest of the mixture. In doing so, the flocculant 109 also aids the mechanical separation of free water from the mixture. In some embodiments, the amount of flocculant 109 added to the first mixture 107 is based at least in part on solids content of the second mixture 111 and/or process water 112. For example, the flocculant 109 may be added to the mixture 107 and/or vessel 108 such that (i) the solids content of the second mixture 111 is greater than a predetermined threshold (e.g., 30%) and/or (b) solids content of the process water 112 is less than a predetermined threshold (e.g., 3%). That is, if the second mixture 111 has a solids content less than 30% solids by weight, the amount of flocculant 109 added to the first mixture 107 and/or vessel 108 may be increased, and/or if the process water 112 has a solids content greater than 3% solids by weight, the amount of flocculant 109 added to the mixture 107 and/or vessel 108 may be increased.

As shown in FIG. 2A, the second mixture 111 can be combined with a second coagulant 115 in a second mixer 116 to form a third mixture 117. The second coagulant 115 can be provided from a coagulant reservoir 114 (e.g., the coagulant reservoir 104) and can be similar or identical to the first coagulant 105 previously described. Accordingly, the second coagulant 115 may include lime and be a lime slurry such that the lime makes up a portion (e.g., no more than 30%, 25%, 20%, 15%, 10%, or 5% by weight) of the lime slurry. The second mixer 116 can be identical or similar to the first mixer 106 previously described.

Adding the second coagulant 115 to the second mixture 111 increases the pH and soluble calcium level (i.e., the amount of calcium cations present) in the third mixture (e.g., via Reaction 4). The increase in the soluble calcium level of the third mixture relative to that of the first and second mixtures is due in part to the removal of bicarbonates via Reactions 1 and 2 that previously occurred after the first coagulant 105 was added to the first mixer 106. As such, the additional calcium cations provided via the second coagulant 115 result in a higher soluble calcium level since the calcium ions are not being consumed by the bicarbonates, which are no longer present or are present in smaller quantities relative to the first and second mixtures. The third mixture can have a pH of at least 11.8, 11.9, 12.0, 12.1, 12.2, 12.3, 12.4, or 12.5, and a soluble calcium level of no more than 300 mg/L, 400 mg/L, 500 mg/L, 600 mg/L, 700 mg/L or 800 mg/L. In some embodiments, the pH of the third mixture is within a range of from about 12.0-12.5, and the soluble calcium level of the third mixture is within a range of from about 300 mg/L-800 mg/L, 300 mg/L-700 mg/L, 400 mg/L-600 mg/L, 450 mg/L-550 mg/L, or other incremental ranges between these ranges. As a result of adding the second coagulant 115 including calcium hydroxide to the second mixture 111, or more specifically providing additional calcium cations and increasing the pH to be at least 12.0, pozzolanic activity can occur via one or both of Reactions 5 and 6.

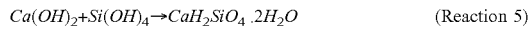
$$Ca(OH)_2 + Si(OH)_4 \rightarrow CaH_2SiO_4 \cdot 2H_2O \quad \text{(Reaction 5)}$$

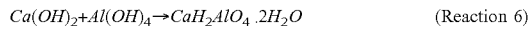
$$Ca(OH)_2 + Al(OH)_4 \rightarrow CaH_2AlO_4 \cdot 2H_2O \quad \text{(Reaction 6)}$$

Per Reaction 5, calcium cations of the second coagulant 115 react with silicic acid ($Si(OH)_4$) functional groups of the clay (e.g., kaolinite ($Al_2Si_2O_5(OH)_4$) or illite ($(K,H_3O)(Al,Mg,Fe)_2(Si,Al)_4O_{10}[(OH)_2,(H_2O)]$) provided via the tailings 103 to produce calcium silicate hydrates ($CaH_2SiO_4 \cdot 2H_2O$). Per Reaction 6, calcium cations of the second coagulant 115 react with aluminate ($Al(OH)_4$) functional groups of the clay provided via the tailings 103 to produce calcium aluminum hydrates ($CaH_2SiO_4 \cdot 2H_2O$). In addition to Reactions 5 and 6, calcium cations provided via the second coagulant 115 can replace cations (e.g., sodium and potassium) on the surface of the clay provided via the tailings 103. Pozzolanic reactions (e.g., Reactions 5 and 6) will only occur in an environment having a pH of at least about 11.8, 11.9, or 12.0. Without being bound by theory, this is because such a pH increases the solubility of silicon and aluminum ions to be sufficiently high and provide the driving force for the pozzolanic reactions to occur.

As a result of Reactions 5 and 6, the stability of the clay is chemically modified. This chemical modification of the clay can cause (i) the particle size of the clay to increase, and (ii) the water layer of the clay particles to generally decrease. Furthermore, as explained in detail elsewhere herein, the produced calcium silicate hydrates and/or calcium aluminum hydrates exhibit properties associated with a cementation matrix that are substantially irreversible. Generally speaking, the pozzolanic reactions therefore increase the shear strength of the third mixture and the downstream product streams.

The previously described pozzolanic reactions will generally not occur for tailings that are treated with coagulants, such as alum, gypsum, and calcium chloride, that do not provide the chemical environment described above. For tailings treated with gypsum or calcium chloride, for example, the calcium cations will generally solubilize at a lower pH (i.e., less than 11.5) and their addition to tailings will not increase the pH (e.g., above 12.0) of the treated mixture. For tailings treated with alum ($Al_2(SO_4)_3$), sulfuric acid is produced which actively decreases pH of the treated mixture. As a result of not having a sufficiently high pH to drive the pozzolanic reactions, the chemical modification of the clay resulting from the pozzolanic reactions will not occur when tailings are treated with these compounds. As such, the shear strength of the resulting mixture and downstream products may be less than that of tailings treated with calcium hydroxide according to embodiments of the present technology. Furthermore, treating tailings with alum, gypsum, and/or calcium chloride is unable to produce over time the chemically modified cementitious crust that embodiments of the present technology are able to produce.

An advantage of the adding the first coagulant 105, flocculant 109, and second coagulant 115 in a step-wise manner, as opposed to adding only a single coagulant, is the decreased cycle time of the overall system 200. That is, adding the flocculant 109 (after adding the first coagulant 105) to the vessel 108 allows the flocculant 109 to flocculate the solution in the vessel 108 without the significant presence of soluble calcium ions, which results in a more desirable floc formation and improved settling of solids in the second mixture 111. Additionally, since the second coagulant 115 is combined with the second mixture 111 after removing bicarbonates (e.g., via the second stream 112), the bicarbonates do not limit the effectiveness of the second coagulant 115 to promote pozzolanic reactions, as may be the case if only a single lime dosage was used.

As further shown in FIG. 2A, the third mixture 117 is conveyed (e.g., via gravity and/or a pump) from the second mixer 116 to the dewatering device 118 or other treatment processes, e.g., via a dewatering device bypass. The other treatment processes can include, e.g., thin lift deposition, thick lift deposition, deep deposition, or water-capping technologies. The dewatering device 118 can include a centrifuge, a filtration system and/or other similar features, components or systems that provide a physical force on the second mixture 117 to promote dewatering, e.g., by separating the second mixture 117 into the first stream 119 (e.g., a product or "cake") and the second stream 120 (e.g., a centrate or a filtrate). The centrifuge can include a scroll centrifugation unit, a solid bowl decanter centrifuge, screen bowl centrifuge, conical solid bowl centrifuge, cylindrical solid bowl centrifuge, a conical-cylindrical solid bowl centrifuge, or other centrifuges used or known in the relevant art. The filtration system can include a vacuum filtration system, a pressure filtration system, belt filter press, or other type of filtering apparatus known in the relevant art that utilizes a desired filtration process. In some embodiments, the filtration system can include a Whatman 50, 2.7 micron filter or similar component or system that can subject the second mixture 117 to at least about 100 psig of air pressure.

The third mixture 117 may be transferred to the centrifuge or filter immediately after mixing in the second mixer 116 (e.g., based on a measured composition taken at an outlet of the second mixer 116) or after a predetermined period of time. In some embodiments, the residence time of the third mixture 117 in the second mixer 116 may be less than 5 minutes, 30 minutes, or one hour. In some embodiments, the third mixture 117 may be retained for more than one hour, e.g., one day, one week, one month, or longer. In general, the third mixture 117 may be retained for any desired amount of time to ensure it has been sufficiently modified for the dewatering device 118 to separate a sufficient or optimal amount of water from the solids of the third mixture 117.

The dewatering device 118 has a first outlet that receives the first stream 119, and a second outlet that receiver the second stream 120. As explained in more detail elsewhere herein (e.g., with reference to FIGS. 4A-14), the first stream 119 can be a solid, soft solid, cake, or pumpable fluid material composed of the particulate matter provided via the tailings 103, such as sand, silt, (chemically modified) clay, and residual bitumen, as well as soluble calcium ions provided via the first and second coagulants 105, 115. The first stream 119 can include a solids content of at least 40%, 45%, 50%, 55%, 60%, 65%, 70%, 75%, 80%, 85%, 90%, or 95% by weight. More generally, the first stream 119 may include a greater percentage of solids by weight than the percentage of liquids by weight. Characteristics (e.g., geotechnical characteristics) of the first stream are described in additional detail herein, e.g., with reference to FIGS. 4A-14. The first stream 119 may be provided to an external site (e.g., a pond, diked area, temporary storage, and/or reclamation area) via a pump, belt, truck, and/or other conveying system(s). In some embodiments, the mixture 117 can be placed on one or more pads in thin/thick lifts to consolidate and dry the solids content contained therein.

The second stream 120 can include a solids content less than 10%, 5%, 4%, 3%, 2%, or 1% by weight. The solids content may include particulate matter such as sand, silt, clay, carbonates, residual bitumen, and/or calcium ions. The second stream 120 can be directed to a pond and/or be used as recycle 122. As shown in FIG. 2A, the recycle 122 can be combined with (a) the tailings reservoir 102 via line 122a, (b) the tailings 103 via line 122b, (c) the coagulant reservoir 104 via line 122c, (d) the first coagulant 105 via line 122d, (e) the coagulant reservoir 114 via line 122e, and/or (f) the second mixture 117 via line 122f. Advantageously, combining the recycle 122 with the tailings 103 can increase the pH of the tailings 103, which can enable soluble calcium cations of the recycle 122 to react with bicarbonates present in the tailings 103 and thereby form insoluble compounds that precipitate out of solution and separate from the tailings 103. Reducing the amount of bicarbonates in the tailings 103 can reduce the amount of the first and second coagulants 105, 115 needed for enhanced dewatering to occur, which in turn can reduce operation costs for the system 200. In some embodiments, the second stream 120 may also be treated with carbon dioxide to reduce the pH and/or the amount of soluble calcium cations of the second stream 120. This can be done via natural absorption of bicarbonates, e.g., by reacting the bicarbonates with carbon dioxide present in the atmosphere, or by actively injecting carbon dioxide into the second stream 120. In such embodiments, the reaction may produce a buffer layer comprising calcium carbonate or bicarbonates on top (e.g., on an outer surface) of the second stream 120, effectively forming a seal.

The system 200 can include the control system 130, as previously described. The control system 130 can be used to control operation of the system 200. For example, the control system 130 can control (e.g., regulate, limit and/or prevent) the flow of fluids (e.g., tailings 103, first coagulant 105, first mixture 107, flocculant 109, second mixture 111, second coagulant 115, third mixture 117, first stream 119, second stream 120, recycle 122, etc.) to and/or from different units (e.g., tailings reservoir 102, coagulant reservoir 104, first mixer 106, vessel 108, flocculant reservoir 110, second mixer 116, dewatering device 118, etc.) of the system 200. Additionally, the control system 130 can control operation of individual units (e.g., the first mixer 106, second mixer 116, dewatering device 118, etc.).

Figure 3:
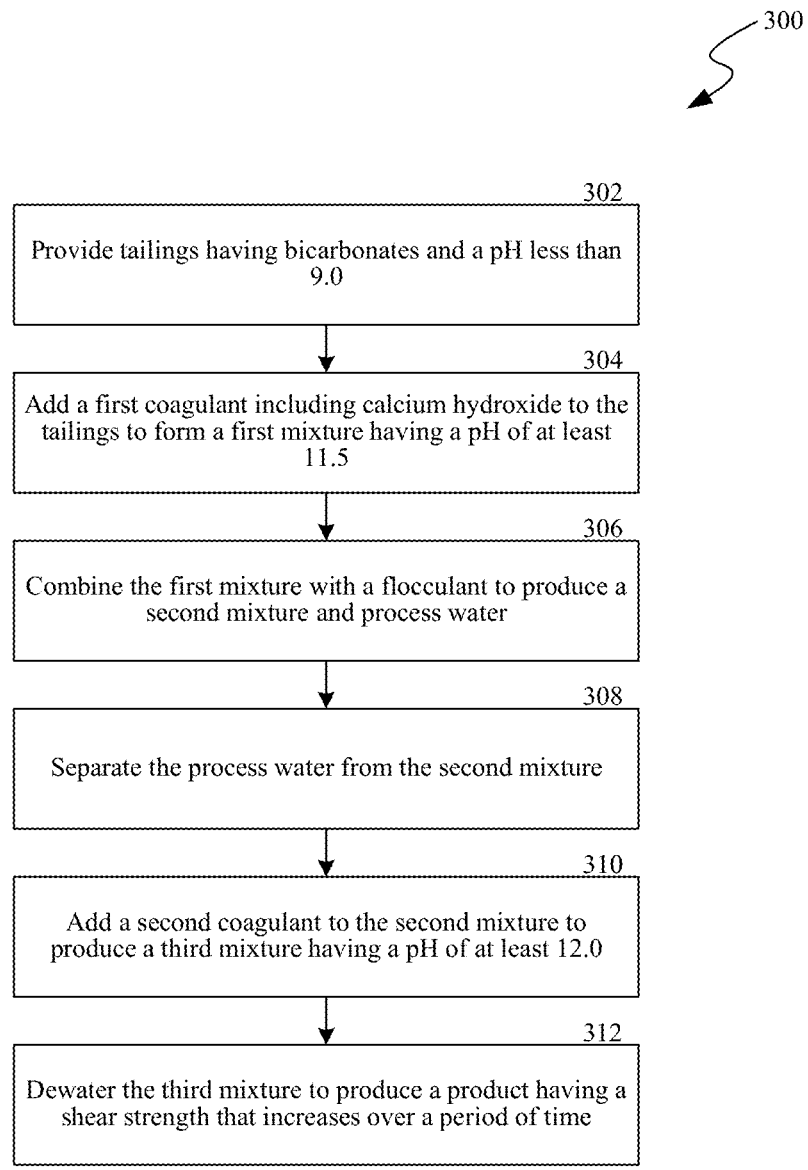
FIG. 3 is a flow diagram of a method for dewatering tailings, in accordance with an embodiment of the present technology.

FIG. 3 is a flow diagram of a method 300 for dewatering tailings, in accordance with embodiments of the present technology. The method 300 includes providing tailings (e.g., the tailings 103; FIGS. 1 and 2A) having bicarbonates and a pH less than 9.0 (process portion 302), and adding a first coagulant (e.g., the first coagulant 105; FIGS. 1 and 2A) including calcium hydroxide to the tailings to form a first mixture (e.g., the first mixture 107; FIGS. 1 and 2A) (process portion 304). For embodiments in which the tailings are provided as a continuous flow or stream, the coagulant may be added as a continuous flow or stream, and for embodiments in which the tailings are provided in batches, the coagulant may be added in individual batches. Adding the first coagulant including calcium hydroxide to the tailings can cause the pH of the tailings to increase to be at least about 11.5, and cause Reactions 1-4 (previously described) to occur within the first mixture.

The method 300 further includes combining the first mixture with a flocculant (e.g., the flocculant 109; FIG. 2A) to produce a second mixture (e.g., the second mixture 111; FIG. 2A) and process water (e.g., process water 112; FIG. 2A) (process portion 306). As explained elsewhere herein, the flocculant can react with clay colloids to form a floc, which can be physically removed along the entrained water (e.g., free water and water molecules produced via Reactions 1 and 2) and promote the mechanical separation of the clay colloids from the mixture. In doing so, the first mixture can separate into the second mixture and the process water.

The method 300 further includes separating or removing the process water from the second mixture (process portion 308). As explained elsewhere herein, this can be done by conveying the second mixture to a downstream container or mixer (e.g., the second mixer 116; FIG. 2A) and/or removing the process water from a vessel (e.g., the thickener vessel 108; FIG. 2A) containing the second mixture and process water. As a result of Reactions 1-4 and removing the process water from the second mixture, the second mixture may include less bicarbonates than the first mixture.

The method 300 further comprises adding a second coagulant (e.g., the second coagulant 115; FIG. 2A) including calcium hydroxide to the second mixture to produce a third mixture (e.g., the third mixture 117; FIG. 2A) (process portion 310). As described elsewhere herein, adding the second coagulant including calcium hydroxide to the tailings, or more specifically, providing additional calcium cations and increasing the pH to at least 12.0, enables pozzolanic activity to occur, e.g., via Reactions 5 and/or 6.

The method 300 further includes dewatering the third mixture to produce a first stream (e.g., the first stream 119; FIG. 2A) having a solids content of at least 40% by weight, and a second stream (e.g., the second stream 120; FIG. 2A) have a solids content less than 10% by weight. Dewatering the third mixture can occur via a dewatering device (e.g., the dewatering device 118; FIG. 2A). The first stream may be provided to an external site (e.g., a pond, diked area, temporary storage, and/or reclamation area) via a pump, belt, truck, and/or other conveying system(s). As explained in additional detail herein, pumping the first stream to the external site can shear the first stream and thereby cause resuspension of the solid minerals of the first stream originally provided via the tailings. As explained in more detail elsewhere herein, the first stream can have an undrained shear strength and/or shear stress that increases over a period of time (e.g., 1 day, 2 days, 3 days, 4 days, 5 days, 6 days, 1 week, 2 weeks, 3 weeks, 1 month, 2 months, 3 months, 6 months, 1 year, or longer). After dewatering (e.g., less than 1 day after dewatering), the undrained shear strength (e.g., peak, average, remolded, or residual undrained shear strength) and/or shear stress (e.g., peak, average, remolded, or residual undrained shear stress) for the third mixture and/or second stream can be, e.g., at least 200 Pa, 500 Pa, 1 kPa, 2 kPa, 2.5 kPa, 3.0 kPa, 3.5 kPa, 4.0 kPa, 4.5 kPa, 5.0 kPa, 5.5 kPa, 6.0 kPa, 6.5 kPa, or 7.0 kPa, as explained in detail elsewhere herein (e.g., with reference to FIGS. 4A-14). Additionally, after dewatering (e.g., more than 1 day after dewatering), the undrained shear strength and/or shear stress for the third mixture and/or second stream can be, e.g., at least 5 kPa, 10 kPa, 20 kPa, 30 kPa, 40 kPa, 50 kPa, 60 kPa, 70 kPa, 80 kPa, 90 kPa, 100 kPa, or 110 kPa. The lower initial shear strength and/or shear stress can be beneficial, as this allows the third mixture and/or second stream to be pumpable, e.g., from the centrifuge to a containment area, as described with reference to FIG. 2A.

III. Experimental Data and Examples

FIGS. 4A-14 show results of examples and tests that corroborate the embodiments described above. The results shown in FIGS. 4A-14 relate to enhanced geotechnical or strength characteristics and correspond to treated tailings streams. The treated tailings streams can correspond to the second mixture 111, third mixture 117, and/or first stream 119 (FIG. 2A) unless noted otherwise. For the results of FIGS. 4A-14, the undrained peak and residual shear strengths of the pressure filtration and/or centrifuge samples (e.g., cakes) were measured via a Brookfield RST-SST rheometer. The samples were deformed at a constant rotational speed of 0.1 revolutions per minute for 15 minutes using a vane measuring system. The cakes produced were placed into 8 mm diameter jars and levelled to obtain a smooth surface. A VT-20-10 spindle (i.e., a spindle with a 20 mm height and 10 mm diameter) was used to measure undrained shear strengths less than 10 kPa (e.g., for the results of FIGS. 4A and 6), and a VT-10-5 spindle (i.e., a spindle with a 10 mm height and 5 mm diameter) was used to measure undrained shear strengths at or above 10 kPa (e.g., for the results of FIG. 4B). The undrained peak shear strength of the samples corresponds to the maximum shear stress recorded during the test (e.g., for the results of FIGS. 4A-5). The undrained remolded shear strength of the samples corresponds to the shear stress retained by the samples post failure (e.g., by shear) (e.g., for the results of FIG. 7). The average undrained peak or remolded shear strength corresponds to the mean value of multiple data points obtained during each undrained shear strength measurement (e.g., for the results of FIGS. 5 and 14). Test methods for determining the shear strength of soils may also correspond to the test methods described in Standard ASTM D5321/D5321M.

Figure 4A:
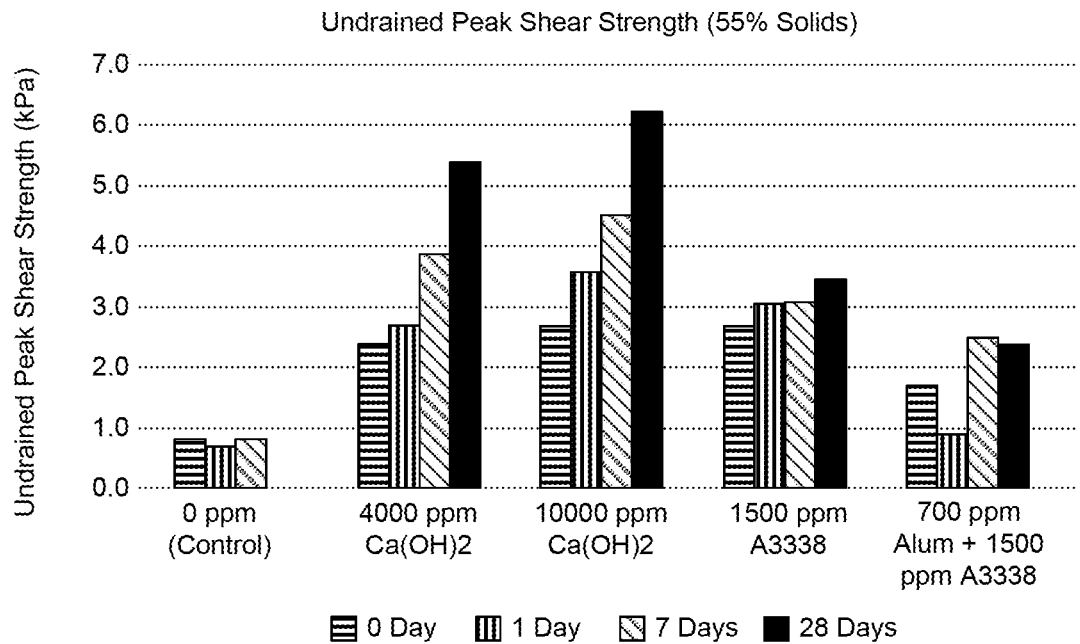
FIGS. 4A and 4B are graphs showing the effects on peak shear strength over time of treating tailings via varying amounts of coagulants and/or flocculants, in accordance with embodiments of the present technology.
Figure 4B:
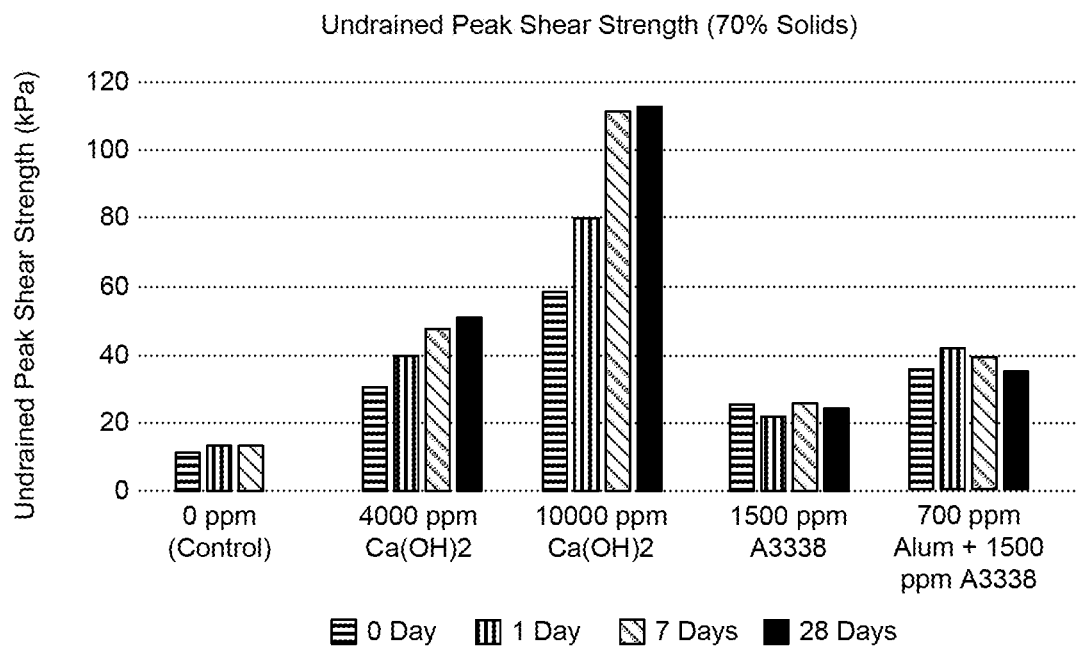

FIGS. 4A and 4B are graphs showing the effects on peak undrained shear strength over time of treated tailings using varying coagulants and/or flocculants, in accordance with embodiments of the present technology. The peak undrained shear strength can be defined as the maximum value of the shear stress measured in an undrained system, and can generally be used to understand the shear stress a given solution or product can sustain before failing. For the tests conducted for FIGS. 4A and 4B, tailings samples were treated using (a) 0 ppm coagulant or flocculant (i.e., a control group), (b) 4000 ppm calcium hydroxide on a wet weight basis, (c) 10000 ppm calcium hydroxide on a wet weight basis, (d) 1500 ppm A3338 polymer (i.e., an anionic polyacrylamide polymer) on a dry solids basis, and (e) a combination of 700 ppm alum on a wet weight basis and 1500 ppm A3338 polymer on a dry solids basis. The undrained peak shear strength was measured for each of the treated tailings samples at 0, 1, 7, and 28 days after treatment. The treated tailings samples were sheared in a cylinder at a shear rate, and the peak shear strength was calculated based on the shear rate and viscosity of the treated tailings.

The results shown in FIG. 4A correspond to treated tailings samples having about 55% solids content by weight. As shown in FIG. 4A, the treated tailings samples corresponding to the 4000 ppm and 10000 ppm calcium hydroxide treated samples were the only samples that exhibited a continuous increase in undrained peak shear strength over time. That is, the undrained peak shear strength of the 4000 ppm calcium hydroxide treated sample increased from about 2.3 kPa at day 0, to 2.6 kPa at day 1, to 3.9 kPa at day 7, to 5.3 kPa at day 28. The undrained peak shear strength of the 10000 ppm calcium hydroxide treated sample exhibited relatively higher shear strength, exhibiting about 2.6 kPa at day 0, 3.5 kPa at day 1, 4.5 kPa at day 7, and 6.2 kPa at day 28. As also shown in FIG. 4A, the control sample exhibited an overall decrease in undrained peak shear strength, the 1500 ppm A3338 treated sample exhibited a slight decrease in undrained peak shear strength from day 1 to day 7, and the 700 ppm alum and 1500 ppm A338 treated sample exhibited a first decrease in undrained peak shear strength from day 0 to day 1 and another decrease in undrained peak shear strength from day 7 to day 28.

The 4000 ppm and 10000 ppm calcium hydroxide treated tailings samples both have a pH above 12.0. Such a pH is necessary to solubilize the silica and/or alumina compounds of the clay such that the silica and/or alumina can react with soluble calcium cations. The clays of these treated tailings samples likely were chemically modified via pozzolanic reactions, which may be responsible for the increase in peak shear strength relative to the other treated tailings samples that were not chemically modified via pozzolanic reactions. The increase in peak shear strength of the 10000 ppm calcium hydroxide sample relative to the 4000 ppm calcium hydroxide sample may be a result of the additional soluble calcium cations present in the 10000 ppm calcium hydroxide treated sample. As described elsewhere herein (e.g., with reference to FIG. 2A), soluble calcium cations are a necessary driving force for chemically converting (i) silicic acid to calcium silicate hydrates and/or (ii) aluminate to calcium aluminum hydrates via pozzolanic reactions (e.g., Reactions 5 and 6). Accordingly, the additional calcium cations of the 10000 ppm calcium hydroxide treated sample may have enabled additional silicic acid and/or aluminate functional groups to be converted to calcium silicate hydrates and calcium aluminum hydrates respectively, thereby causing the peak shear strength of the 10000 ppm calcium hydroxide treated sample to be higher than that of the 4000 ppm calcium hydroxide treated sample.

The results shown in FIG. 4B correspond to treated tailings samples having about 70% solids content by weight. As shown in FIG. 4B, the treated tailings samples corresponding to the 4000 ppm and 10000 ppm calcium hydroxide treated samples were the only samples that exhibited a continuous increase in undrained peak shear strength over time. That is, the undrained peak shear strength of the 4000 ppm calcium hydroxide treated sample increased from about 30 kPa at day 0, to 39 kPa at day 1, to 48 kPa at day 7, to 52 kPa at day 28. The undrained peak shear strength of the 10000 ppm calcium hydroxide treated sample exhibited relatively higher undrained peak shear strength, providing about 58 kPa at day 0, 80 kPa at day 1, 100 kPa at day 7, and 102 kPa at day 28. The control sample exhibited no increase in undrained peak shear strength between days 1 and 7, the 1500 ppm A3338 treated sample exhibited a slight overall decrease in undrained peak shear strength, and the 700 ppm alum and 1500 ppm A338 treated sample exhibited no overall increase in undrained peak shear strength from day 0 to day 28.

Comparing the results of FIGS. 4A and 4B with one another, the increase in solids content of the treated samples affects the peak shear strength of the calcium hydroxide treated samples. That is, the undrained peak shear strengths for the 4000 ppm and 10000 ppm calcium hydroxide treated samples are higher for the 70% solids content relative to the 55% solids content. Accordingly, the undrained peak shear strength appears to be directly correlated to the percent solids content of the calcium hydroxide treated samples.

Figure 5:
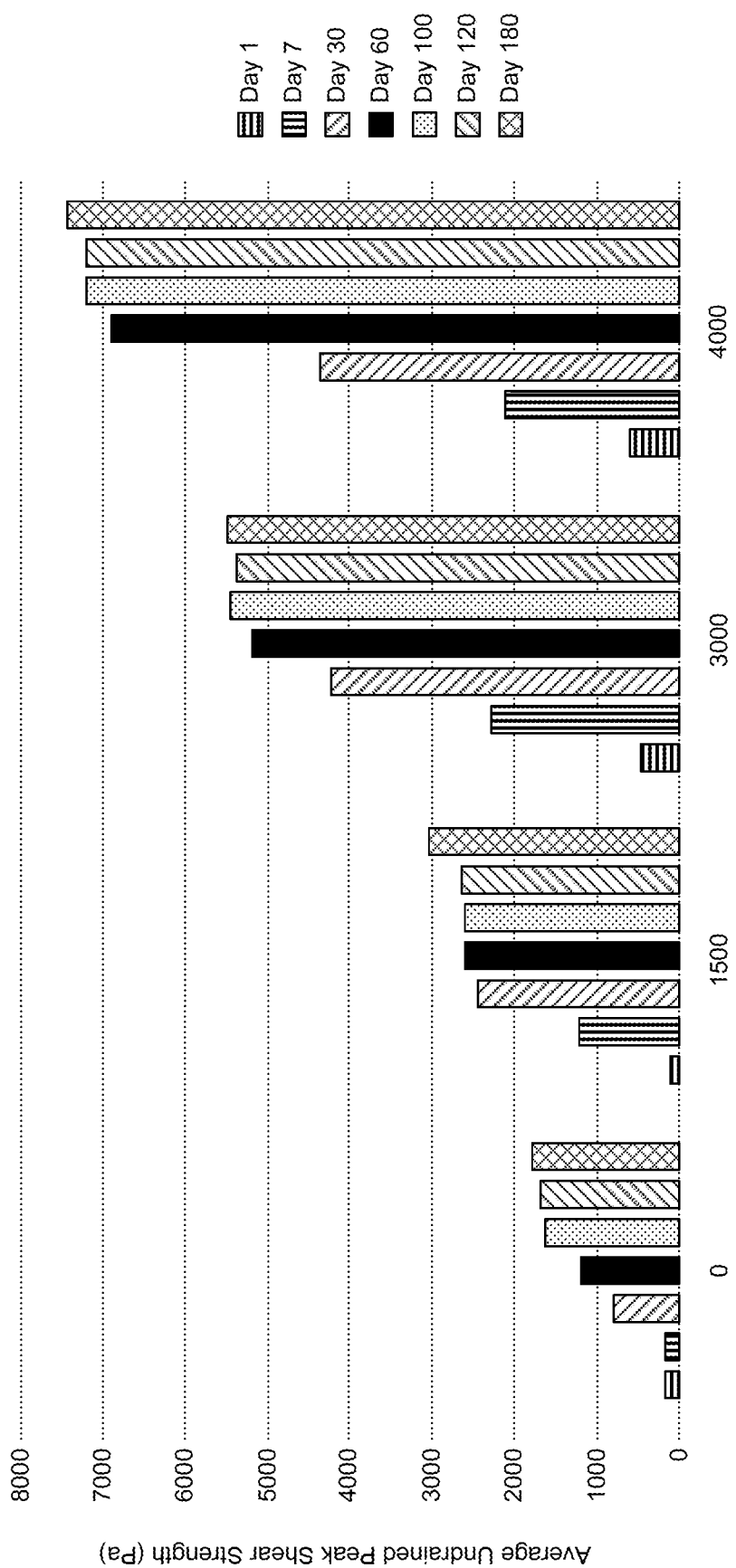
FIG. 5 is a graph showing the effect of calcium hydroxide concentration on average undrained peak shear strength of treated tailings over time, in accordance with embodiments of the present technology.

FIG. 5 is a graph showing the effect of calcium hydroxide concentration on average peak undrained shear strength of dewatered tailings over time, in accordance with embodiments of the present technology. For the tests conducted for FIG. 5, dewatered tailings samples, which may be referred to as "cakes," having a solids content within a range from about 50% to 70% solids were treated using (a) 0 ppm coagulant or flocculant (i.e., a control group), (b) 1500 ppm calcium hydroxide on a wet weight basis, (c) 3000 ppm calcium hydroxide on a wet weight basis, and (d) 4000 ppm calcium hydroxide on a wet weight basis.

As shown in FIG. 5, each of the treated tailings samples exhibits an increase in average undrained peak shear strength over time, with the measured average undrained peak shear strength for day 180 being the highest measurement for each of the samples. As such, each of the treated samples exhibited a continuous increase in average undrained peak shear strength over a time period of 180 days. Additionally, the overall average undrained peak shear strength is directly correlated to the calcium hydrogen concentration. That is, the overall average undrained peak shear strength for the 1500 ppm calcium hydroxide treated sample is higher than that of the control group (i.e., the 0 ppm calcium hydroxide treated sample), the overall average undrained peak shear strength for the 3000 ppm calcium hydroxide treated sample is higher than that of the 1500 ppm calcium hydroxide treated sample, and the overall average undrained peak shear strength for the 4000 ppm calcium hydroxide treated sample is higher than that of the 3000 ppm calcium hydroxide treated sample.

The 3000 ppm and 4000 ppm calcium hydroxide treated samples each have a pH above 12.0. Accordingly, the clays of these treated samples likely were chemically modified via pozzolanic reactions which, without being bound by theory, are responsible for (i) the increase in average undrained peak shear strength relative to the other treated tailings samples, and (ii) the average undrained peak shear strength being above 5.0 kPa after day 60. The increase in average undrained peak shear strength of the 3000 ppm calcium hydroxide sample relative to the 1500 ppm and/or 0 ppm calcium hydroxide samples may be a result of the pozzolanic reactions that occurred for the 3000 ppm calcium hydroxide treated sample. Additionally, the increase in average undrained peak shear strength of the 4000 ppm calcium hydroxide treated sample relative to the 3000 ppm calcium hydroxide treated sample may be a result of the additional soluble calcium cations present in the 4000 ppm calcium hydroxide treated sample. As described elsewhere herein (e.g., with reference to FIG. 2A), soluble calcium cations are a necessary driving force for chemically converting (i) silicic acid to calcium silicate hydrates and/or (ii) aluminate to calcium aluminum hydrates via pozzolanic reactions (e.g., Reactions 5 and 6). Accordingly, the additional calcium cations of the 4000 ppm calcium hydroxide treated sample may enable additional silicic acid and/or aluminate functional groups to be converted to calcium silicate hydrates and calcium aluminum hydrates respectively, thereby causing the average undrained peak shear strength of the 4000 ppm calcium hydroxide treated sample to be higher than that of the 3000 ppm calcium hydroxide treated sample.

Figure 6:
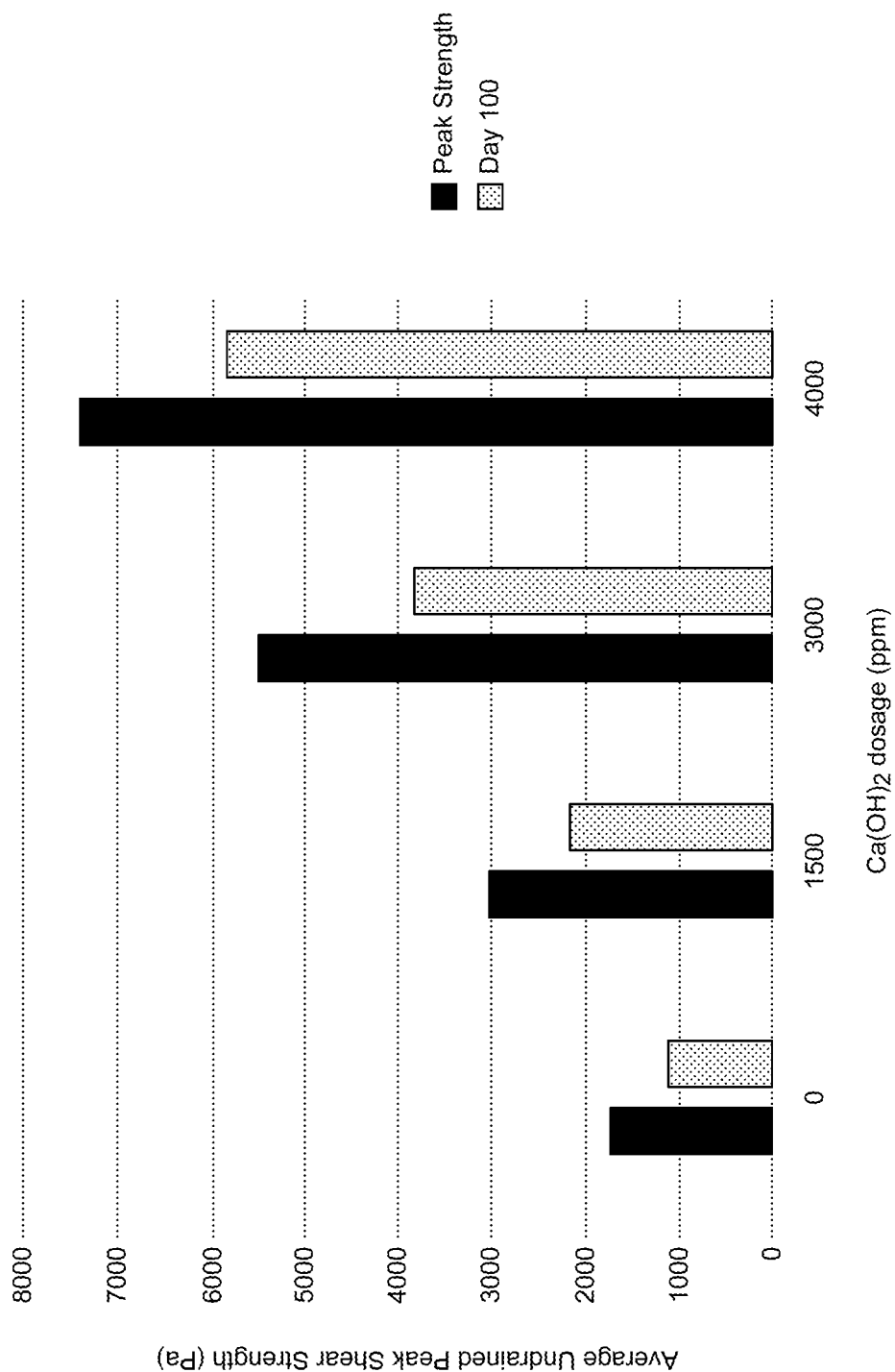
FIG. 6 is a graph showing the effect of calcium hydroxide concentration on undrained peak and remolded shear strength of treated tailings after dewatering, in accordance with embodiments of the present technology.

FIG. 6 is a graph showing the effect of calcium hydroxide concentration on undrained peak and remolded shear strength of treated dewatered tailings after 6 months of curing, in accordance with embodiments of the present technology. Remolded shear strength corresponds to the magnitude of shear stress a treated tailings can sustain after being disturbed in an undrained condition. For the tests conducted for FIG. 6, the undrained remolded shear strength is the shear strength retained by the samples post failure by shearing the soils using the rotation of a vane spindle at given rates of shear. For the tests conducted for FIG. 6, tailings samples having a solids content within a range from about 50% to 70% solids were treated using (a) 0 ppm coagulant or flocculant (i.e., a control group), (b) 1500 ppm calcium hydroxide on a wet weight basis, (c) 3000 ppm calcium hydroxide on a wet weight basis, and (d) 4000 ppm calcium hydroxide on a wet weight basis. Each of the treated tailings samples exhibited an increase in peak and remolded shear strength as the calcium hydroxide concentration was increased. That is, the treated samples indicate a direct correlation between calcium hydroxide concentration and peak and remolded undrained shear strength. Notably, the 3000 ppm and 4000 ppm calcium hydroxide treated samples each have a pH above 12.0. Accordingly, the clays of these treated samples likely were chemically modified via pozzolanic reactions, which may be responsible for (i) the increase in peak and remolded shear strength relative to the other treated tailings samples, and (ii) the peak shear strength being above 5000 Pa after day 60.

Figure 7:
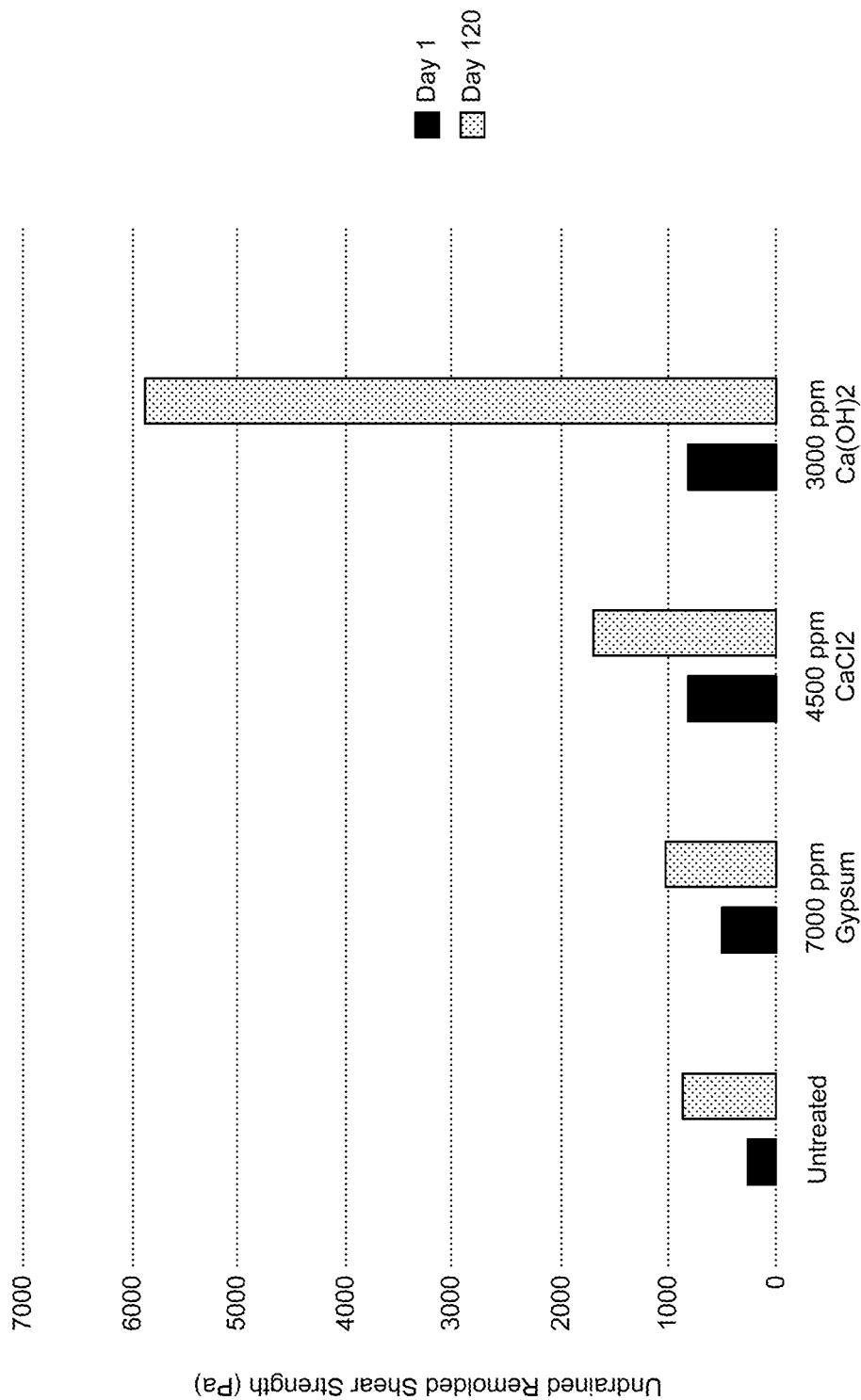
FIG. 7 is a graph showing the effect of coagulants on undrained remolded shear strength of treated tailings over time, in accordance with embodiments of the present technology.

FIG. 7 is a graph showing the effect of coagulants on remolded shear strength of treated tailings over time, in accordance with embodiments of the present technology. For the tests conducted for FIG. 7, tailings samples were treated using (a) 0 ppm coagulant or flocculant (i.e., a control group), (b) 7000 ppm gypsum on a wet weight basis, (c) 4500 ppm calcium chloride on a wet weight basis, and (d) 3000 ppm calcium hydroxide on a wet weight basis. The coagulant doses were selected to provide a 1600 ppm supply of calcium. The remolded shear strength for each of the treated tailings samples was measured at day 1 and day 120 after treatment.

As shown in FIG. 7, the samples for the control group, 7000 ppm gypsum, and 4500 ppm calcium chloride exhibited a remolded shear strength below 2000 Pa, whereas the 3000 ppm calcium hydroxide treated sample exhibited a remolded shear strength of about 5900 Pa. The 3000 ppm calcium hydroxide sample had a pH above 12.0. Accordingly, the clays of this tailings sample was likely modified via pozzolanic reactions, which may be responsible for (i) the increase in remolded shear strength relative to the other treated tailings samples, and (ii) the remolded shear strength being above 5000 Pa after day 60.

Figure 8:
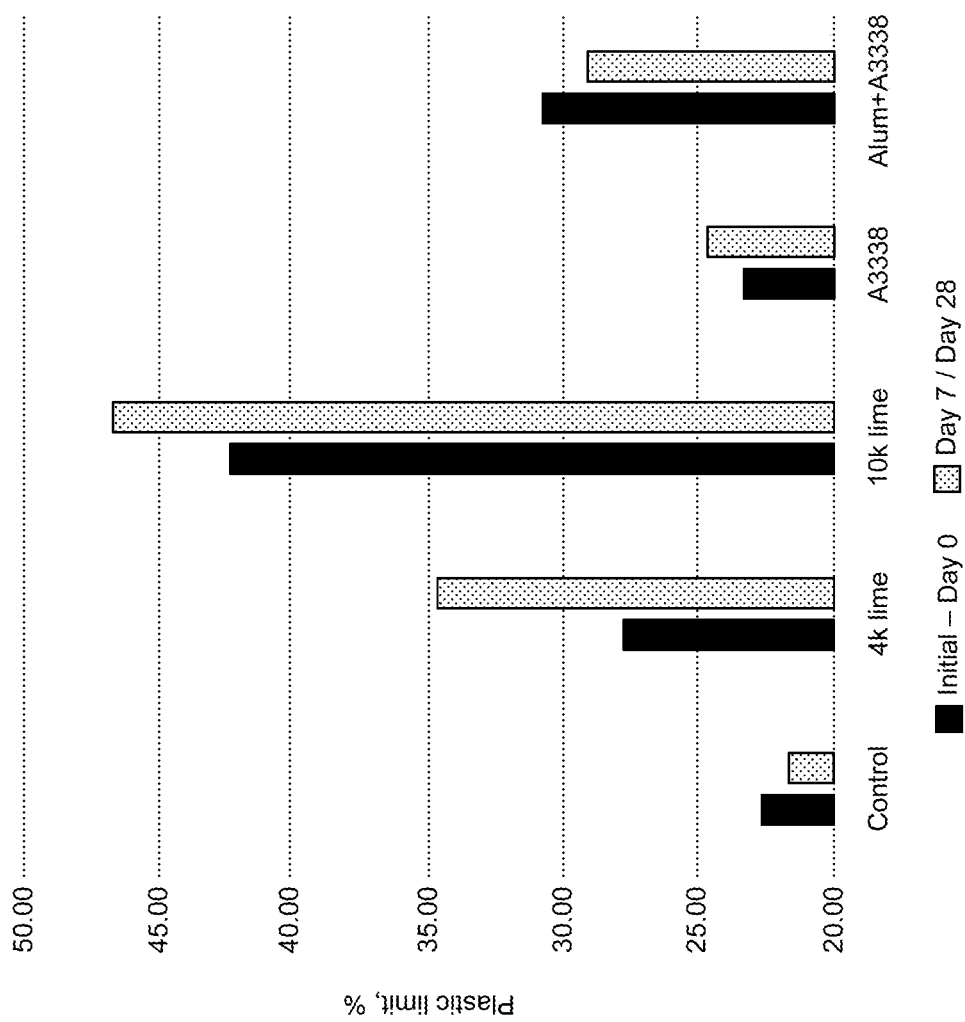
FIG. 8 is a graph showing the effect of coagulants and/or flocculants on the plastic limits of treated tailings over time, in accordance with embodiments of the present technology.

FIG. 8 is a graph showing the effect of coagulants and/or flocculants on the plastic limits of treated tailings over time, in accordance with embodiments of the present technology. For the tests conducted for FIG. 8, tailings samples were treated using (a) 0 ppm coagulant or flocculant (i.e., a control group), (b) 4000 ppm calcium hydroxide on a wet weight basis, (c) 10000 ppm calcium hydroxide on a wet weight basis, (d) 1500 ppm A3338 polymer on a dry solids basis, and (e) a combination 700 ppm alum on a wet weight basis and 1500 ppm A3338 polymer on a dry solids basis. The plastic limits were measured for each of the treated tailings samples at day 0 and day 28 after treatment. Generally speaking, the plastic limit corresponds to the water content at which a sample begins to transition from a plastic state to a solid state, or stated differently, the plastic limit corresponds to the maximum amount of moisture content a sample (e.g., a "cake") can hold while still behaving as a plastic and not a solid. It is generally desirable for the plastic limit of a treated tailings sample to increase over time, as this indicates the geotechnical or strength characteristics have improved such that the sample can transition from a plastic state to a solid state at higher moisture contents.

As shown in FIG. 8, the 4000 ppm and 10000 ppm calcium hydroxide treated samples exhibited the largest percent and overall change in plastic limit, with the plastic limit for the 4000 ppm calcium hydroxide treated sample increasing from about 27% to 35%, and the plastic limit for the 10000 ppm calcium hydroxide treated sample increasing from about 42% to 47%. The control group and alum+ A3338 samples exhibited decreases in their plastic limits, and the A3338 samples exhibited a slight increase. The plastic limit of the A3338 treated sample at day 28 was about 25%, which was less than the plastic limit of the 4000 ppm and 10000 ppm calcium hydroxide treated samples at day 0.

The 4000 ppm and 10000 ppm calcium hydroxide treated tailings samples both have a pH above 12.0. Accordingly, the clay of these treated tailings samples likely were chemically modified via pozzolanic reactions, which may be responsible for their increase in plastic limit over time relative to the other treated tailings samples that were not chemically modified via pozzolanic reactions. The increase in plastic limit of the 10000 ppm calcium hydroxide sample relative to the 4000 ppm calcium hydroxide sample may be a result of the additional soluble calcium cations present in the 10000 ppm calcium hydroxide treated sample.

Figure 9:
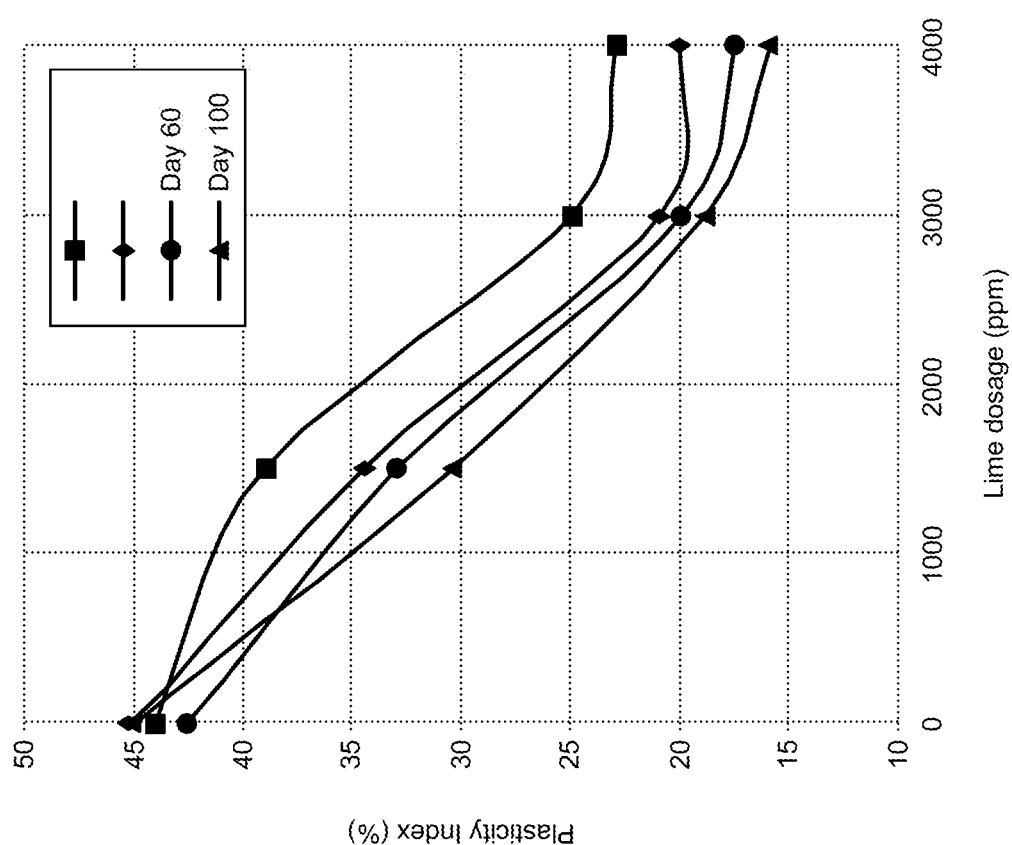
FIG. 9 is a graph showing the effect of calcium hydroxide concentration on the plasticity index of treated tailings over time, in accordance with embodiments of the present technology.

FIG. 9 is a graph showing the effect of calcium hydroxide concentration on the plasticity index of treated tailings over time, in accordance with embodiments of the present technology. For the tests conducted for FIG. 9, tailings samples were treated using (a) 0 ppm coagulant or flocculant (i.e., a control group), (b) 1500 ppm calcium hydroxide on a wet weight basis, (c) 3000 ppm calcium hydroxide on a wet weight basis, and (d) 4000 ppm calcium hydroxide on a wet weight basis. Each of the treated samples were measured at days 1, 30, 60, and 100. The plasticity index measures the liquid and plastic limits of a soil, or more particularly the difference between the liquid and plastic limits, and tends to be high for soils with clay. It is generally desirable for the plasticity index of a treated tailings sample to decrease over time, as this indicates that the texture of the clays present in the tailings is modified, e.g., via (i) coagulation and increase in particle size, and/or (ii) pozzolanic reactions to calcium silicate hydrates and/or calcium aluminum hydrates.

As shown in FIG. 9, the plasticity index decreases over time for the 1500 ppm, 3000 ppm, and 4000 ppm calcium hydroxide treated samples. The control group shows generally no overall change or a slight overall increase in plasticity index from about 44% on day 1 to about 45% on day 100. Notably, the plasticity indexes for the 3000 ppm and 4000 ppm calcium hydroxide treated samples are significantly less than the 1500 ppm calcium hydroxide treated sample. This may be due to pozzolanic reactions chemically modifying the clays of the 3000 ppm and 4000 ppm samples, as they have a pH above 12.0.

Figure 10:
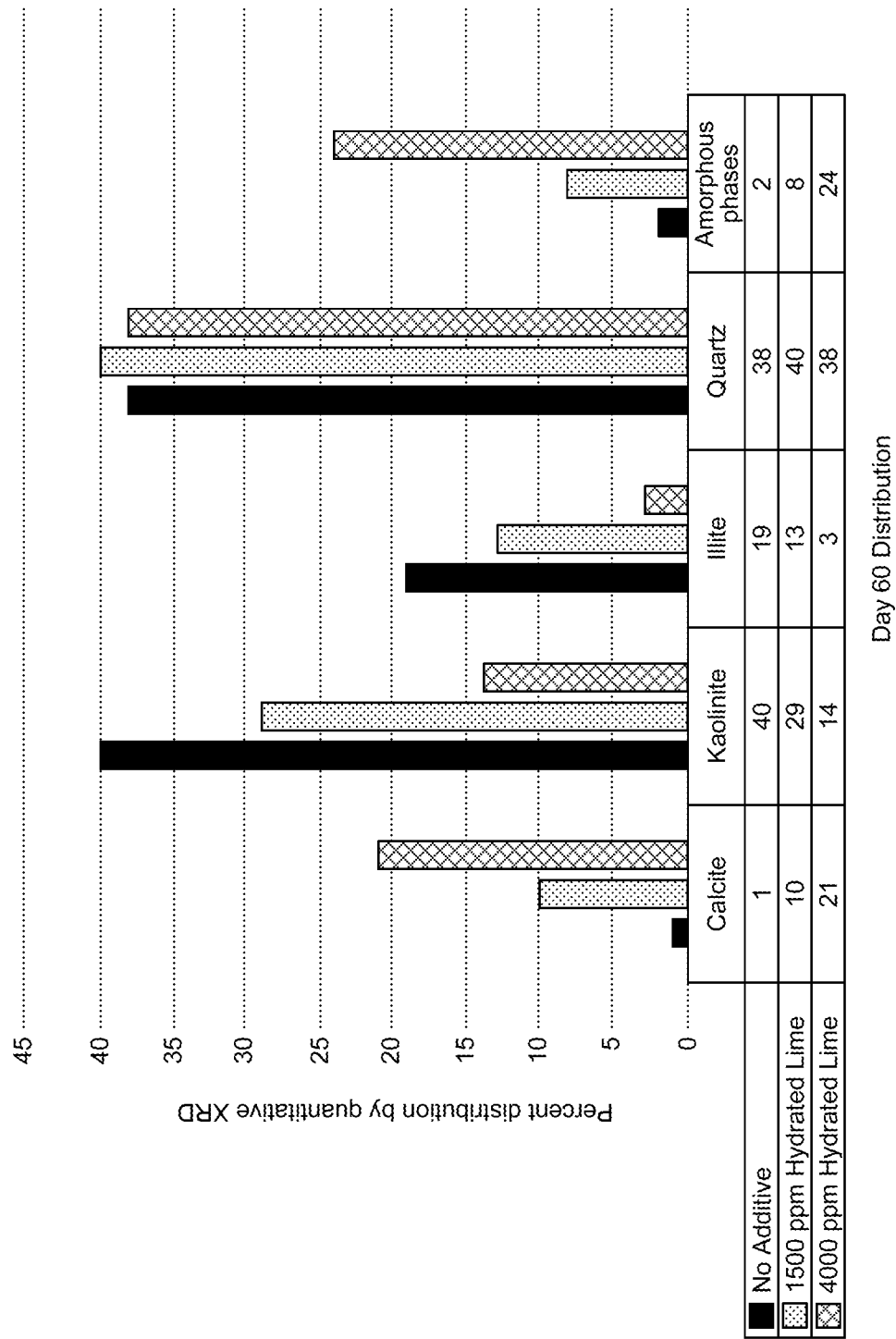
FIG. 10 is a graph showing the effect of calcium hydroxide concentration on the composition of treated tailings over time, in accordance with embodiments of the present technology.

FIG. 10 is a graph showing the effect of calcium hydroxide concentration on the composition of treated tailings over time, in accordance with embodiments of the present technology. For the tests conducted for FIG. 10, tailings samples were treated using (a) 0 ppm coagulant or flocculant (i.e., a control group), (b) 1500 ppm calcium hydroxide on a wet weight basis, and (c) 4000 ppm calcium hydroxide on a wet weight basis. The composition of the samples was measured 60 days after treatment to determine the amount of calcite (i.e., calcium carbonate), kaolinite, illite, quartz, and amorphous phase materials. The amorphous phase materials include calcium silicate hydrates, calcium aluminum hydrates, and/or those materials produced as a result of cementitious or pozzolanic reactions.

As shown in FIG. 10, as more calcium hydroxide was added to the tailings samples (i) the composition of calcite and amorphous phase materials increased, and (ii) the composition of kaolinite and illite decreased. The composition of quartz remained generally constant for each of the samples, which is expected since quartz is generally not reactive with calcium hydroxide. Per Reactions 1-4, described elsewhere herein (e.g., with reference to FIG. 2A), the increase in calcite indicates the conversion of bicarbonates of the tailings via reaction with calcium cations from the calcium hydroxide. Per Reactions 5 and 6, described elsewhere herein (e.g., with reference to FIG. 2A), the decrease in kaolinite and illite and increase in amorphous phase materials indicate the conversion of kaolinite and illite (and other clays not shown in FIG. 10) to amorphous phase materials. Moreover, the relatively significant decrease in kaolinite and illite for the 4000 ppm treated sample, relative to the 1500 ppm relative sample, indicates the effect of pozzolanic reactions since only the 4000 ppm treated sample had a pH of at least 12.0. For the 4000 ppm and 1500 ppm treated samples, this may explain the about (i) 50% decrease in kaolinite, (ii) 75% decrease in illite, and (iii) 300% increase in amorphous phase materials.

Figure 11:
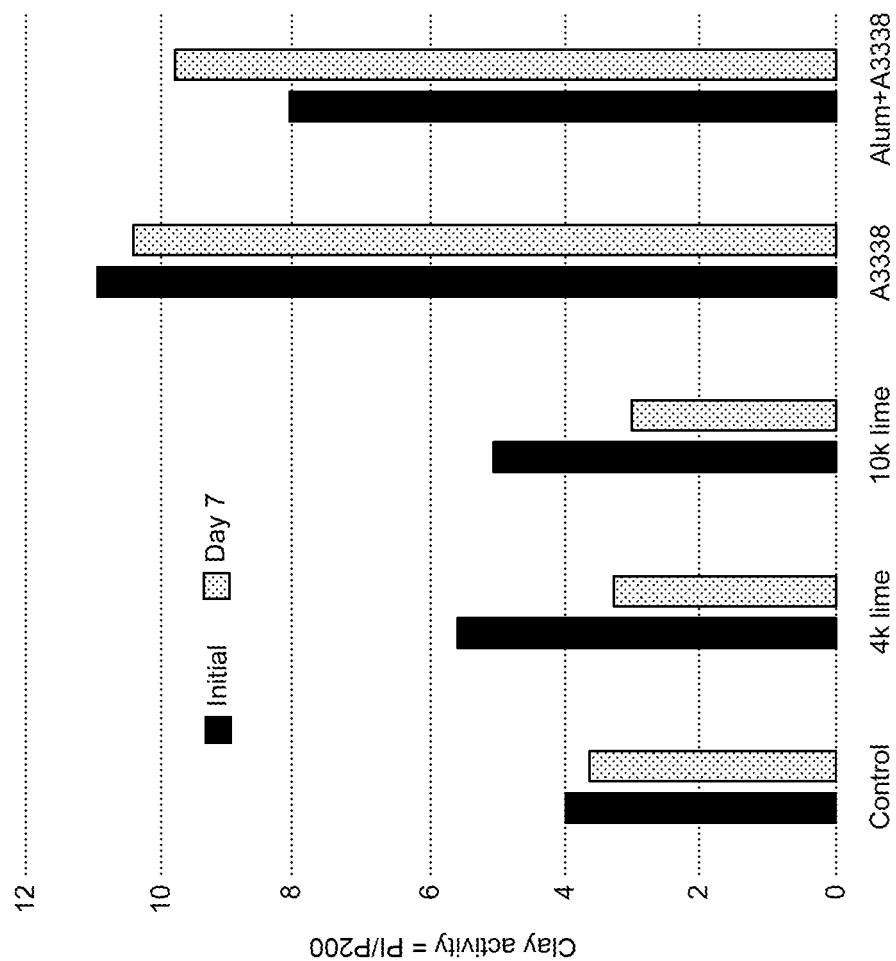
FIG. 11 is a graph showing the effect of coagulants and/or flocculants on the clay activity of treated tailings over time, in accordance with embodiments of the present technology.

FIG. 11 is a graph showing the effect of coagulants and/or flocculants on the clay activity of treated tailings over time, in accordance with embodiments of the present technology. For the tests conducted for FIG. 11, tailings samples were treated using (a) 0 ppm coagulant or flocculant (i.e., a control group), (b) 4000 ppm calcium hydroxide on a wet weight basis, (c) 10000 ppm calcium hydroxide, (d) 1500 ppm A3338 polymer on a dry solids basis, and (e) a combination of 700 ppm alum on a wet weight basis and 1500 ppm A3338 polymer on a dry solids basis. The colloidal clay activity was measured for each of the treated tailings samples at 0 and 7 days after treatment as the ratio of plasticity index to the percentage by weight of particles finer than 2 microns. Generally, a decrease in clay activity is a measure of the clays either being dissolved at a pH of at least 12.0, or being dissolved and chemically modified by pozzolanic reactions with the soluble calcium ions released by calcium hydroxide to form calcium silicate hydrate and/or calcium aluminate hydrates.

As shown in FIG. 11, the 4000 and 10000 ppm calcium hydroxide treated samples exhibited the largest decrease in clay activity, with the 4000 ppm calcium hydroxide treated sample decreasing from about 5.6 at day 0 to about 3.3 at day 7, and the 10000 ppm calcium hydroxide treated sample decreasing from about 5.0 at day 0 to about 3.0 at day 7. The control group and 1500 ppm A3338 polymer treated samples exhibited slight decreases in clay activity, and the 700 ppm alum and 1500 ppm A3338 polymer exhibited an increase in clay activity. The relatively large decrease in clay activity exhibited by the 4000 and 10000 ppm treated samples indicates the effect of pozzolanic reactions, in accordance with embodiments of the present technology.

Figure 12:
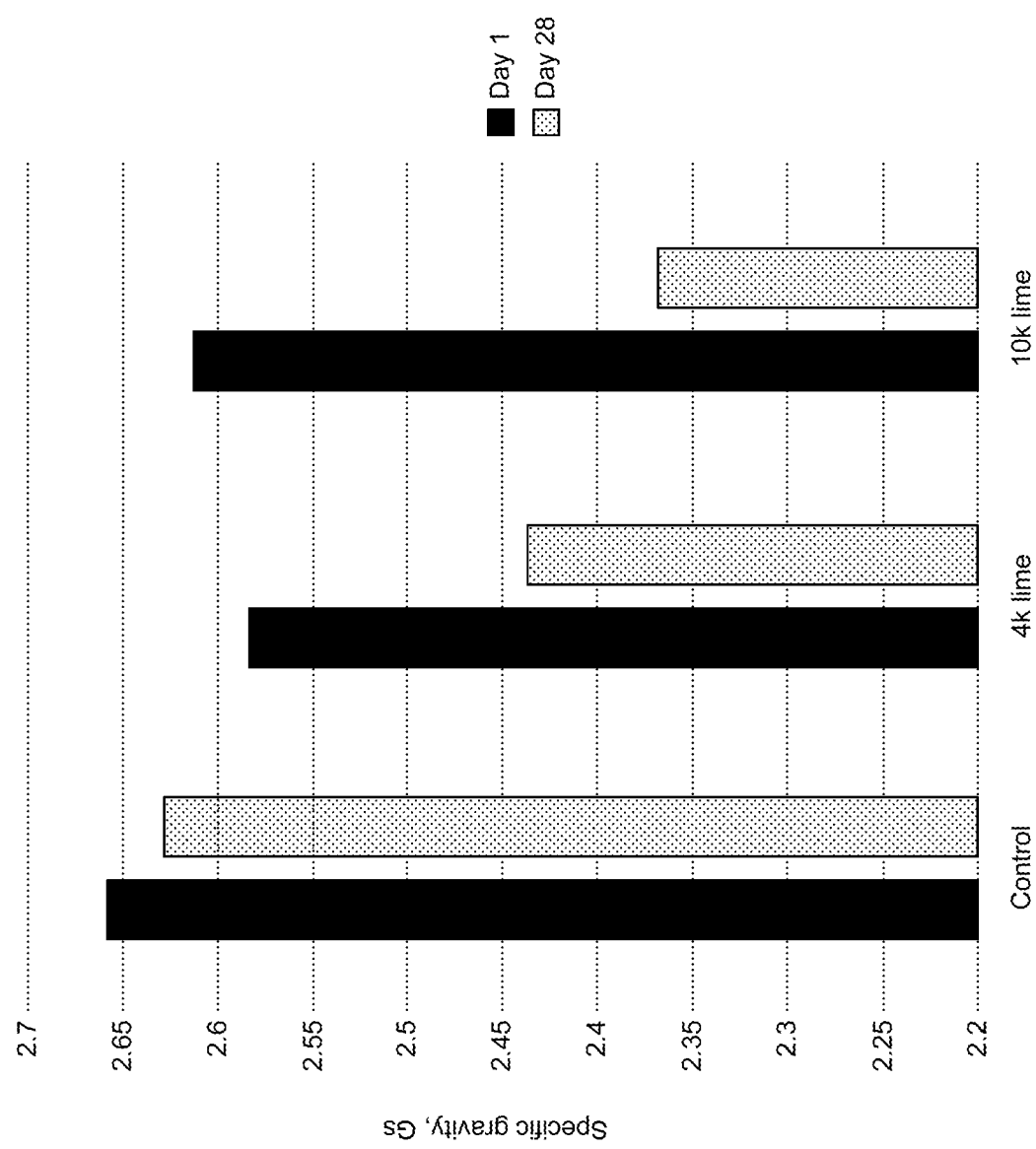
FIG. 12 is a graph showing the effect of calcium hydroxide concentration on the specific gravity of treated tailings over time, in accordance with embodiments of the present technology.

FIG. 12 is a graph showing the effect of lime concentration on the specific gravity of treated tailings over time, in accordance with embodiments of the present technology. For the tests conducted for FIG. 12, tailings samples were treated using (a) 0 ppm coagulant or flocculant (i.e., a control group), (b) 4000 ppm calcium hydroxide on a wet weight basis, and (c) 10000 ppm calcium hydroxide on a wet weight basis. The specific gravity was measured for each of the treated tailings samples at 0 and 28 days after treatment.

As shown in FIG. 12, the control group sample exhibited a slight decrease in specific gravity from about 2.66 to 2.63 (i.e., a 1% decrease), the 4000 ppm calcium hydroxide treated sample exhibited a larger decrease in specific gravity from about 2.58 to 2.44 (i.e., a 5% decrease), and the 10000 ppm calcium hydroxide treated sample exhibited an even larger decrease in specific gravity from about 2.61 to 2.37 (i.e., a 9% decrease). The calcium silicate hydrates and calcium aluminum hydrates produced via pozzolanic reactions, as discussed elsewhere herein, have higher specific volume and lower specific gravities than clay materials present in untreated tailings. Accordingly, the decrease in specific gravity of the 4000 ppm and 10000 ppm calcium hydroxide samples, each of which corresponds to a pH above 12.0, may be due to pozzolanic activity and the conversion of clay to calcium silicate hydrates and/or calcium aluminum hydrates.

Figure 13:
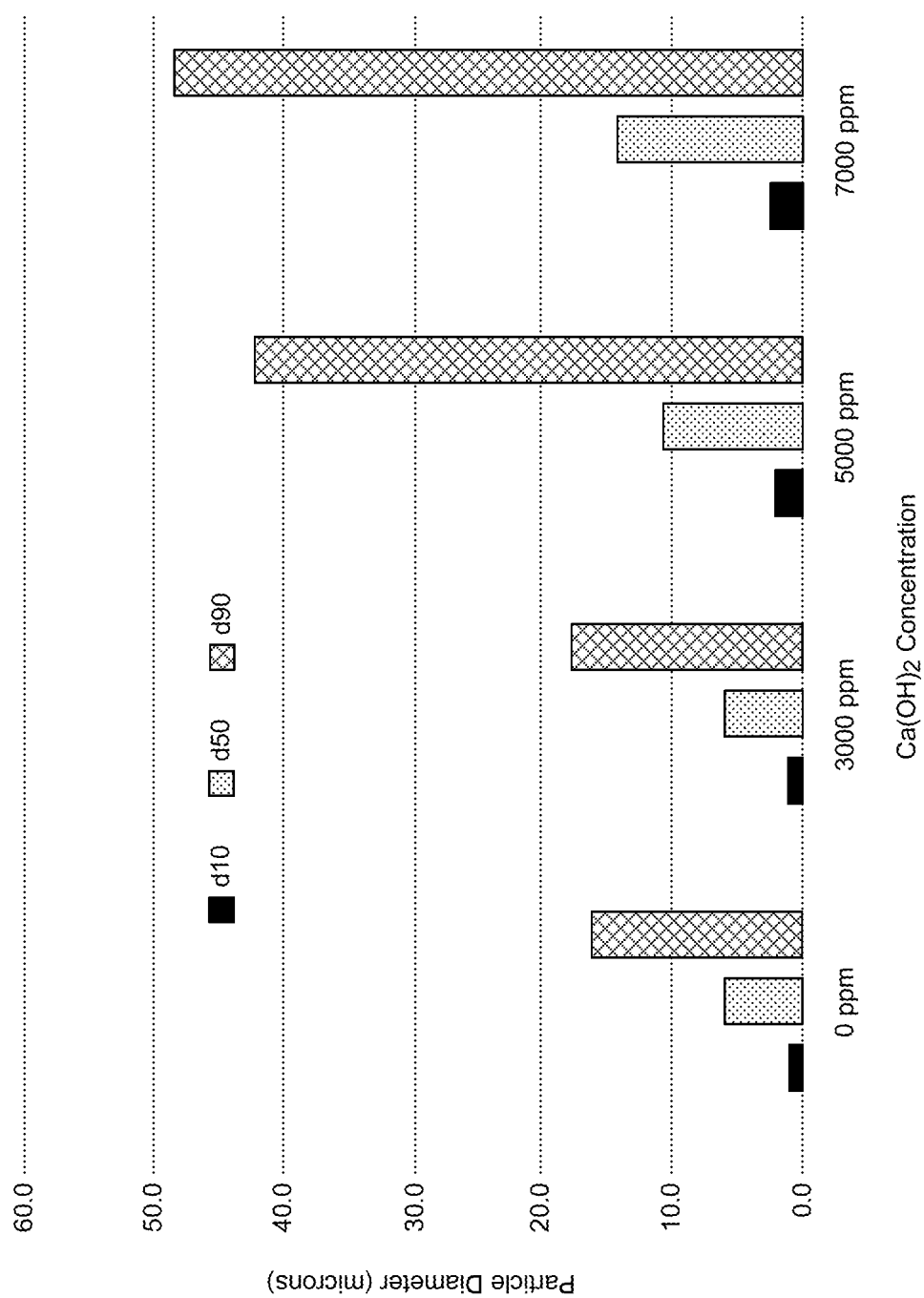
FIG. 13 is a graph showing the effect of calcium hydroxide concentration on the particle size of treated tailings, in accordance with embodiments of the present technology.

FIG. 13 is a graph showing the effect of calcium hydroxide concentration on particle size of treated tailings, in accordance with embodiments of the present technology. For the tests conducted for FIG. 13, tailings samples were treated using (a) 0 ppm coagulant or flocculant (i.e., a control group), (b) 3000 ppm calcium hydroxide on a wet weight basis, (c) 5000 ppm calcium hydroxide on a wet weight basis, and (d) 7000 ppm calcium hydroxide on a wet weight basis. The diameter of the particles at which 10% ("d10"), 50% ("d50"), and 90% ("d90") of the samples are below was measured 21 days after treatment.

As shown in FIG. 13, the particle diameters generally increase as the concentration of calcium hydroxide increases. For example, the d90 increases from about 17 microns for the 0 ppm sample, to about 18 microns for the 3000 ppm sample, to about 42 for the 5000 ppm sample, to about 49 for the 7000 ppm sample. Accordingly, the particles size of the treated tailings samples is directly correlated to the concentration of calcium hydroxide added thereto. As also shown in FIG. 13, there is a relatively large increase in the d90 particle diameter from the 3000 ppm to the 5000 ppm sample. Generally speaking, the particle size diameter and/or particle size distribution for a tailings sample may depend in large part on the texture of the clays. Accordingly, the relatively large increase in the d90 particle diameter may be due to the additional calcium hydroxide or calcium ions present in the 5000 ppm and 7000 ppm samples, which enabled pozzolanic reactions to occur and thereby chemically converted the clays (e.g., kaolinite, illite, etc.) to calcium silicate hydrates and/or calcium aluminum hydrates.

Figure 14:
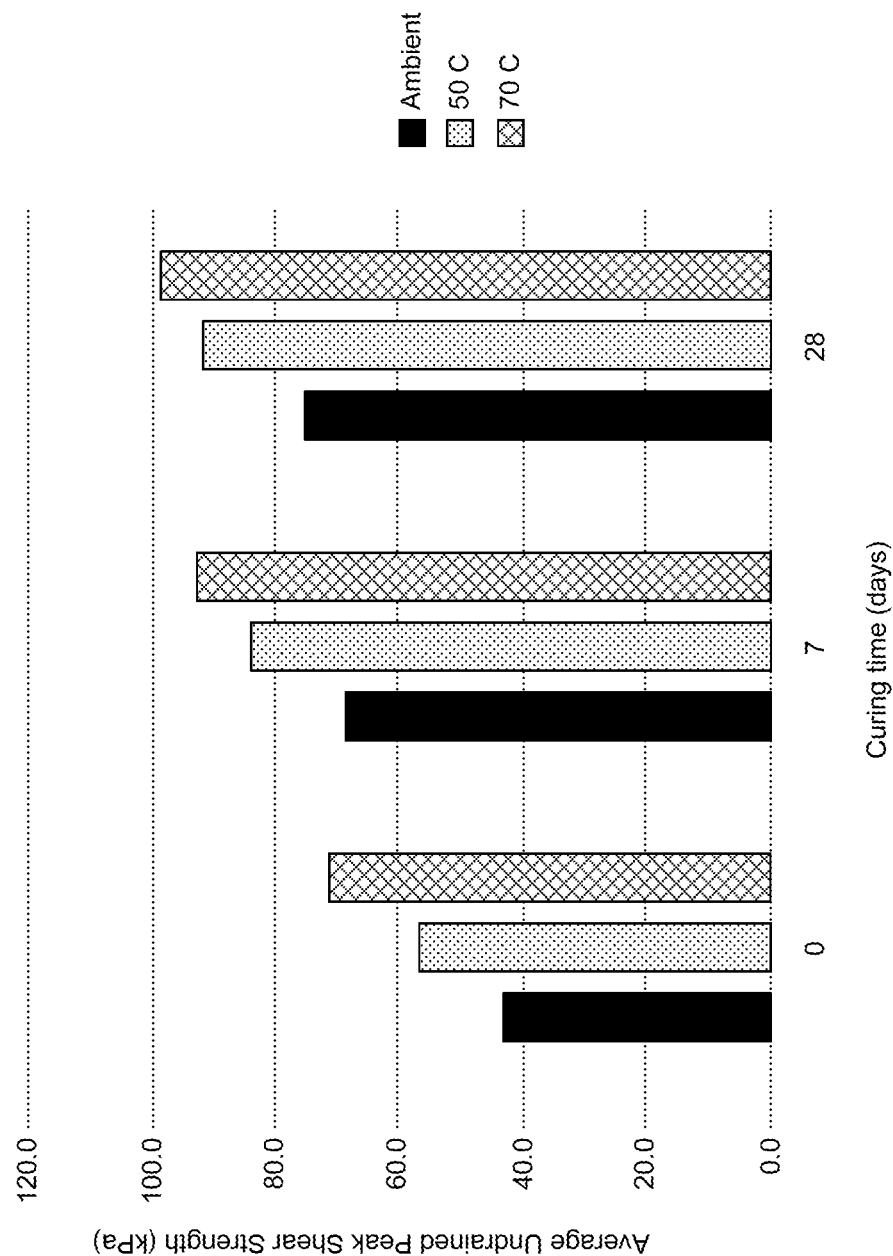
FIG. 14 is a graph showing the effect of temperature on undrained peak shear strength of treated tailings over time, in accordance with embodiments of the present technology.

FIG. 14 is a graph showing the effect of temperature over time on undrained peak shear strength of treated tailings over time, in accordance with embodiments of the present technology. For the tests conducted for FIG. 14, the tailings were heated to (a) an ambient environment, (b) 50° C., and (c) 70° C. prior to or during mixing with calcium hydroxide. The ambient and heated tailings were then provided to a pressure filter. The pressure filtered tailings had about 70% solids content by weight. The undrained peak shear strength for each of the pressure filtered tailings was measured at days 0, 7, and 28.

As shown in FIG. 14, at days 0, 7, and 28 the undrained peak shear strength for the 70° C. sample was higher than that of the 50° C. sample, which was higher than that of the ambient sample. For example, at day 28 the undrained peak shear strength of the (a) ambient sample was about 7.5 kPa, (b) 50° C. sample was 9.5 kPa, and (c) 70° C. sample was about 9.8 kPa. As such, the undrained shear strength at day 28, relative to the ambient sample, increased by about 26% for the 50° C. sample and 30% for the 70° C. sample.

IV. Conclusion

It will be apparent to those having skill in the art that changes may be made to the details of the above-described embodiments without departing from the underlying principles of the present disclosure. In some cases, well known structures and functions have not been shown or described in detail to avoid unnecessarily obscuring the description of the embodiments of the present technology. Although steps of methods may be presented herein in a particular order, alternative embodiments may perform the steps in a different order. Similarly, certain aspects of the present technology disclosed in the context of particular embodiments can be combined or eliminated in other embodiments. Furthermore, while advantages associated with certain embodiments of the present technology may have been disclosed in the context of those embodiments, other embodiments can also exhibit such advantages, and not all embodiments need necessarily exhibit such advantages or other advantages disclosed herein to fall within the scope of the technology. Accordingly, the disclosure and associated technology can encompass other embodiments not expressly shown or described herein, and the invention is not limited except as by the appended claims.

Throughout this disclosure, the singular terms "a," "an," and "the" include plural referents unless the context clearly indicates otherwise. Similarly, unless the word "or" is expressly limited to mean only a single item exclusive from the other items in reference to a list of two or more items, then the use of "or" in such a list is to be interpreted as including (a) any single item in the list, (b) all of the items in the list, or (c) any combination of the items in the list. Additionally, the term "comprising," "including," and "having" should be interpreted to mean including at least the recited feature(s) such that any greater number of the same feature and/or additional types of other features are not precluded.

Reference herein to "one embodiment," "an embodiment," "some embodiments" or similar formulations means that a particular feature, structure, operation, or characteristic described in connection with the embodiment can be included in at least one embodiment of the present technology. Thus, the appearances of such phrases or formulations herein are not necessarily all referring to the same embodiment. Furthermore, various particular features, structures, operations, or characteristics may be combined in any suitable manner in one or more embodiments.

Unless otherwise indicated, all numbers expressing concentrations, shear strength, and other numerical values used in the specification and claims, are to be understood as being modified in all instances by the term "about." Accordingly, unless indicated to the contrary, the numerical parameters set forth in the following specification and attached claims are approximations that may vary depending upon the desired properties sought to be obtained by the present technology. At the very least, and not as an attempt to limit the application of the doctrine of equivalents to the scope of the claims, each numerical parameter should at least be construed in light of the number of reported significant digits and by applying ordinary rounding techniques. Additionally, all ranges disclosed herein are to be understood to encompass any and all subranges subsumed therein. For example, a range of "1 to 10" includes any and all subranges between (and including) the minimum value of 1 and the maximum value of 10, i.e., any and all subranges having a minimum value of equal to or greater than 1 and a maximum value of equal to or less than 10, e.g., 5.5 to 10.

The disclosure set forth above is not to be interpreted as reflecting an intention that any claim requires more features than those expressly recited in that claim. Rather, as the following claims reflect, inventive aspects lie in a combination of fewer than all features of any single foregoing disclosed embodiment. Thus, the claims following this Detailed Description are hereby expressly incorporated into this Detailed Description, with each claim standing on its own as a separate embodiment. This disclosure includes all permutations of the independent claims with their dependent claims.

The present technology is illustrated, for example, according to various aspects described below. Various examples of aspects of the present technology are described as numbered examples (1, 2, 3, etc.) for convenience. These are provided as examples and do not limit the present technology. It is noted that any of the dependent examples may be combined in any combination, and placed into a respective independent example. The other examples can be presented in a similar manner.

1. A method for treating a tailings stream from oil sands or mining operations, comprising:
providing a tailings stream comprising (i) a solids content of from 3% to 40% by weight, (ii) bicarbonates, and (iii) a pH less than 9.0;
adding a coagulant comprising calcium hydroxide to the tailings stream to form a mixture having a pH of at least 11.5 and a soluble calcium level of no more than 800 mg/L, wherein the pH and soluble calcium level promote pozzolanic reactions to occur within the mixture; and
after adding the coagulant to the tailings stream, dewatering the mixture to produce a product having a solids content of at least 40% by weight, wherein a shear strength of the product increases over a period of time of at least two days.

2. The method of any one of the previous examples, wherein the shear strength of the product is an undrained shear strength that, after the period of time, is at least 3.0 kilopascals (kPa).

3. The method of any one of the previous examples, wherein the shear strength of the product is an undrained shear strength that, after the period of time, is at least 5.0 kilopascals (kPa).

4. The method of any one of the previous examples, wherein a plasticity index of the product is less than 30 after the period of time.

5. The method of any one of the previous examples, wherein a residual or remolded shear strength of the product, after the period of time, is at least 1.5 kilopascals (kPa).

6. The method of any one of the previous examples, wherein the period of time is at least 7 days, 14 days, 30 days, 60 days, 120 days, or 180 days.

7. The method of any one of the previous examples, further comprising, prior to dewatering the mixture, adding a flocculant comprising a polymer to the mixture, wherein the polymer includes polyacrylamide.

8. The method of any one of the previous examples, wherein the coagulant is a first coagulant, the mixture is a first mixture, and the pH of the first mixture is no more than 12.0, the method further comprising:
adding a flocculant comprising a polymer to the first mixture to form a second mixture, wherein the polymer is configured to bond with clay of the first mixture while releasing process water;
removing or separating the process water from the second mixture; and
adding a second coagulant comprising calcium hydroxide to the second mixture to form a third mixture having a pH of at least 12.0, 9. The method of example 5, wherein dewatering comprises dewatering the third mixture to produce release water, the method further comprising exposing the release water to air such that carbon dioxide of the air reacts with calcium of the release water to form at least one of calcium carbonate or a buffer comprising bicarbonates.

10. The method of any one of the previous examples, wherein (i) the coagulant is a first coagulant, (ii) the mixture is a first mixture, (iii) the pH of the first mixture is no more than 12.0, and (iv) the soluble calcium level of the first mixture is no more than 100 mg/L, the method further comprising:
adding a second coagulant comprising calcium hydroxide to the first mixture to form a second mixture having a pH of at least 12.0 and a soluble calcium level of no more than 800 mg/L, wherein the pH and soluble calcium level of the second mixture promote pozzolanic reactions to occur within the second mixture, and
wherein dewatering comprises dewatering the second mixture.

11. The method of example 7, wherein the second mixture comprises clay provided via the tailings stream, and wherein the pH and the soluble calcium level of the second mixture promotes pozzolanic reactions such that the clay is converted to calcium silicate hydrates and/or calcium aluminum hydrates.

12. The method of any one of the previous examples, wherein the pozzolanic reactions occurring within the mixture do not produce gaseous carbon dioxide as a byproduct.

13. The method of any one of the previous examples, wherein the coagulant is a slurry comprising from 1% to 20% calcium hydroxide.

14. The method of any one of the previous examples, further comprising allowing the mixture to settle over a predetermined period of time of at least two days.

15. The method of any one of the previous examples, wherein the calcium hydroxide comprises particles having a specific surface area of at least 25 $m^2/g$.

16. The method of any one of the previous examples, wherein particles of the product, before the period of time, comprise a first average particle size, and wherein the particles of the product, after the period of time, comprise a second average particle size larger than the first average particle size.

17. The method of any one of the previous examples, wherein the product, before the period of time, comprises particles having a d90 less than 20 microns, and wherein the d90 of the particle, after the period of time, is greater than 20 microns.

18. The method of any one of the previous examples, wherein adding the coagulant comprises adding at least 3,000 ppm calcium hydroxide on a wet weight basis.

19. The method of any one of the previous examples, wherein adding the coagulant comprises adding at least 8,000 ppm calcium hydroxide on a wet weight basis.

20. The method of any one of the previous examples, wherein the shear strength is undrained shear strength or undrained peak shear strength.

21. The method of any one of the previous examples, wherein the shear strength is undrained shear stress or undrained peak shear stress.

22. The method of any one of the previous examples, wherein the shear strength is undrained shear strength, the method further comprising, after the dewatering, shearing the mixture by pumping the product to a containment area, wherein the shear strength of the product after shearing and after the period of time is at least 3.0 kilopascals.

23. The method of any one of the previous examples, wherein the tailings stream comprises fly ash tailings, oil sands tailings or mining tailings.

24. The method of any one of the previous examples, wherein the product comprises a solids content of at least 65% by weight.

25. The method of any one of the previous examples, further comprising heating the product to a temperature of at least 50° C. for the period of time.

26. The method of any one of the previous examples, wherein the product is a cake.

27. A system for treating tailings from oil sands or mining operations, comprising:
 a mixer or in-line mixing area configured to—
  receive (i) tailings comprising clay and bicarbonates and (ii) a coagulant comprising calcium hydroxide, and
  mix the tailings and coagulant to form a first mixture comprising a pH of at least 11.5 and a soluble calcium level of no more than 800 mg/L; and
 a dewatering device downstream of the thickener vessel and configured to dewater the first mixture to produce a product having a shear strength that increases over a period of time of at least two days.

28. The system of any one of the previous examples, wherein the shear strength of the product, after the period of time, is at least 3.0 kilopascals.

29. The system of any one of the previous examples, wherein the shear strength of the product is an undrained shear strength that, after the period of time, is at least 5.0 kilopascals.

30. The system of any one of the previous examples, wherein a plasticity index of the product is less than 30 after the period of time.

31. The system of any one of the previous examples, wherein a residual or remolded shear strength of the product, after the period of time, is at least 1.5 kilopascals.

32. The system of any one of the previous examples, wherein the period of time is at least 7 days, 14 days, 30 days, 60 days, 120 days, or 180 days.

33. The system of any one of the previous examples, further comprising a thickener vessel downstream of the mixer and configured to (i) receive the first mixture and (ii) produce process water and a second mixture, wherein the dewatering device is configured to dewater the second mixture, and wherein the thickener vessel is configured to receive a flocculant comprising a polyacrylamide polymer.

34. The system of any one of the previous examples, wherein (i) the coagulant is a first coagulant, (ii) the pH of the first mixture is no more than 12.0, (iii) the mixer is a first mixer, and (iv) the soluble calcium level of the first mixture is no more than 100 mg/L, the system further comprising:
 a thickener vessel downstream of the first mixer and configured to (i) receive the first mixture and (ii) produce process water and a second mixture; and
 a second mixer downstream of the thickener vessel and configured to (i) receive the second mixture and a second coagulant comprising calcium hydroxide, and (ii) mix the second mixture and second coagulant to produce a third mixture having a pH of at least 12.0,
 wherein the dewatering device is configured to dewater the third mixture to produce the product.

35. The system of example 34, wherein dewatering the third mixture produces release water, the system further comprising a containment area configured to (i) receive the release water, and (ii) expose the release water to air such that carbon dioxide of the air reacts with alkaline calcium of the release water to form at least one of calcium carbonate or a buffer comprising bicarbonates or carbonates on an outer surface of the product.

36. The system of any one of examples 34 or 35, wherein the second mixture comprises clay provided via the tailings, and wherein the pH and the soluble calcium level of the third mixture promotes pozzolanic reactions such that the clay is converted to silicate hydrates and/or aluminum hydrates.

37. The system of any one of the previous examples, wherein the coagulant is a slurry comprising 1% to 10% calcium hydroxide.

38. The system of any one of the previous examples, wherein the calcium hydroxide comprises particles having a specific surface area of at least 25 $m^2/g$.

39. The system of any one of the previous examples, wherein particles of the product, before the period of time, comprise a first average particle size, and wherein the particles, after the period of time, comprise a second average particle size larger than the first average particle size.

40. The system of any one of the previous examples, wherein the product, before the period of time, comprises particles such that a d90 of the particles is 20 microns, and wherein the d90 of the particle, after the period of time, is greater than 20 microns.

41. The system of any one of the previous examples, wherein the coagulant comprises at least 3,000 mg/L calcium hydroxide.

42. The system of any one of the previous examples, wherein the coagulant comprises at least 8,000 mg/L calcium hydroxide.

43. The system of any one of the previous examples, wherein the product comprises a solids content of at least 65% by weight.

44. The system of any one of the previous examples, further comprising heating the product to a temperature of at least 50° C. for the period of time.

45. The system of any one of the previous examples, wherein the product is a cake.

46. A method for treating tailings from oil sands or mining operations, comprising:
  providing tailings comprising (i) a solids content of from 3% to 40% by weight, and (ii) bicarbonates;
  adding a first coagulant comprising calcium hydroxide to the tailings to form a first mixture, the first mixture having (i) a pH within a range of 11.5 to 12.0 and (ii) a soluble calcium level of no more than 200 mg/L;
  adding a flocculant comprising a polymer to the first mixture to form a second mixture;
  adding a second coagulant comprising calcium hydroxide to the second mixture to form a third mixture, the third mixture having a pH of at least 12.0 and a soluble calcium level of no more than 800 mg/L, wherein the pH and soluble calcium level promote pozzolanic reactions to occur within the third mixture; and
  after adding the second coagulant to the tailings, dewatering the third mixture to produce a product having a solids content of at least 40% by weight and a release water having a solids content less than 10% by weight, wherein an undrained shear strength of the product continually increases over a period of time of at least two days.

47. The method of any one of the previous examples, wherein the product, after the period of time, includes a plasticity index of less than 30.

48. The method of any one of the previous examples, wherein the third mixture comprises clay, and wherein the pH and the soluble calcium level of the third mixture promotes pozzolanic reactions such that the clay is converted to calcium silicate hydrates and/or calcium aluminum hydrates.

49. The method of any one of the previous examples, wherein the flocculant is added to the first mixture in a vessel, the method further comprising removing process water from the vessel prior to adding the second coagulant to the second mixture.

50. The method of any one of the previous examples, wherein the pH of the first mixture is no more than 12.0.

We claim:

1. A method for treating a tailings stream, comprising:
  providing a tailings stream comprising (i) a solids content of from 3% to 40% by weight, (ii) bicarbonates, and (iii) a pH less than 9.0;
  adding a coagulant comprising calcium hydroxide to the tailings stream to form a mixture having a pH of at least 12.0 and a soluble calcium level of no more than 800 mg/L, wherein the pH and soluble calcium level promote pozzolanic reactions to occur within the mixture; and
  after adding the coagulant to the tailings stream, dewatering the mixture to produce a product having a solids content of at least 40% by weight, wherein shear strength of the product increases over a period of time of at least two days to at least 1.5 kilopascals.

2. The method of claim 1, wherein the shear strength of the product is an undrained shear strength that, after the period of time, is at least 5.0 kilopascals (kPa).

3. The method of claim 1, wherein the period of time is at least 14 days.

4. The method of claim 1, further comprising, prior to dewatering the mixture, adding a flocculant comprising a polymer to the mixture, wherein the polymer includes polyacrylamide.

5. The method of claim 1, wherein dewatering comprises dewatering the mixture to produce release water, the method further comprising exposing the release water to air such that carbon dioxide of the air reacts with calcium of the release water to form at least one of calcium carbonate or a buffer comprising bicarbonates.

6. The method of claim 1, wherein the mixture comprises clay provided via the tailings stream, and wherein the pH and the soluble calcium level of the mixture promotes pozzolanic reactions such that the clay is converted to calcium silicate hydrates and/or calcium aluminum hydrates.

7. The method of claim 1, wherein the pozzolanic reactions occurring within the mixture do not produce gaseous carbon dioxide as a byproduct.

8. The method of claim 1, wherein the calcium hydroxide comprises particles having a specific surface area of at least 25 $m^2/g$.

9. The method of claim 1, wherein the product, before the period of time, comprises particles having a d90 less than 20 microns, and wherein the d90 of the particle, after the period of time, is greater than 20 microns.

10. The method of claim 1, wherein adding the coagulant comprises adding at least 8,000 ppm calcium hydroxide.

11. The method of claim 1, wherein the shear strength is an undrained shear strength or undrained peak shear strength.

12. A method for treating tailings, comprising:
  obtaining tailings comprising clay and bicarbonates;
  combining at least a portion of the tailings with a first coagulant comprising calcium hydroxide to form a first mixture having a pH of at least 11.5 to no more than 12.0;
  combining a second coagulant comprising calcium hydroxide with the first mixture to form a second mixture having a pH of at least 12.0 and a soluble calcium level of no more than 800 mg/L, wherein the pH and soluble calcium level promote pozzolanic reactions to occur within the second mixture; and
  dewatering the second mixture to produce a product having a shear strength that increases over a period of time of at least two days to be at least 1.5 kilopascals.

13. The method of claim 12, wherein combining at least a portion of the tailings with the first coagulant occurs in a first mixer upstream of a thickener vessel, and combining the second coagulant with the first mixture occurs within a second mixer downstream of the thickener vessel.

14. The method of claim 13, further comprising separating, via the thickener vessel, the first mixture into release water and the second mixture.

15. The method of claim 12, further comprising, prior to combining the second coagulant with the first mixture, removing or separating water from the first mixture.

16. The method of claim 12, wherein the first mixture has a soluble calcium level of no more than 100 mg/L.

17. The method of claim 12, further comprising adding a flocculant comprising a polymer to the first mixture, the polymer being configured to bond with clay of the first mixture.

18. A system for treating tailings, comprising:
a mixer or inline mixing area configured to
   receive (i) tailings comprising clay and bicarbonates and (ii) a coagulant comprising calcium hydroxide, and
   mix the tailings and coagulant to form a first mixture comprising a pH of at least 12.0 and a soluble calcium level of no more than 800 mg/L; and
a dewatering device configured to dewater the mixture to produce a product having a shear strength that increases over a period of time of at least two days to at least 1.5 kilopascals.

19. The system of claim 18, wherein the shear strength of the product, after the period of time, is at least 5.0 kilopascals.

20. The system of claim 18, wherein dewatering the mixture produces release water, the system further comprising a containment area configured to (i) receive the release water, and (ii) expose the release water to air such that carbon dioxide of the air reacts with alkaline calcium of the release water to form at least one of calcium carbonate or a buffer comprising bicarbonates or carbonates.

21. The system of claim 18, wherein the coagulant is a slurry comprising 1% to 10% calcium hydroxide.

22. The system of claim 18, wherein particles of the product, before the period of time, comprise a first average particle size, and wherein the particles, after the period of time, comprise a second average particle size larger than the first average particle size.

\* \* \* \* \*

UNITED STATES PATENT AND TRADEMARK OFFICE
CERTIFICATE OF CORRECTION

PATENT NO. : 10,894,730 B2
APPLICATION NO. : 16/566578
DATED : January 19, 2021
INVENTOR(S) : Jared Ira Leikam et al.

It is certified that error appears in the above-identified patent and that said Letters Patent is hereby corrected as shown below:

On the Title Page

Item (73) Assignee: Please change "Graymony (PA) Inc., Pleasant Gap, PA (US)" to -- Graymont Western Canada Inc., Richmond, (CA) --.

Signed and Sealed this
Third Day of September, 2024

Katherine Kelly Vidal
*Director of the United States Patent and Trademark Office*